US009232696B2

(12) United States Patent
Reijersen Van Buuren et al.

(10) Patent No.: US 9,232,696 B2
(45) Date of Patent: Jan. 12, 2016

(54) BALE FORMING APPARATUS AND METHOD WITH PIVOTAL GUIDING ELEMENT

(71) Applicant: FORAGE INNOVATIONS B.V., Maassluis (NL)

(72) Inventors: Willem Jacobus Reijersen Van Buuren, Maassluis (NL); Rudy De Jong, Maassluis (NL)

(73) Assignee: FORAGE INNOVATIONS B.V., Maassluis (NL)

( * ) Notice: Subject to any disclaimer, the term of this patent is extended or adjusted under 35 U.S.C. 154(b) by 0 days.

(21) Appl. No.: 14/394,863

(22) PCT Filed: Apr. 19, 2013

(86) PCT No.: PCT/NL2013/050292
§ 371 (c)(1),
(2) Date: Oct. 16, 2014

(87) PCT Pub. No.: WO2013/157952
PCT Pub. Date: Oct. 24, 2013

(65) Prior Publication Data
US 2015/0068187 A1 Mar. 12, 2015

(30) Foreign Application Priority Data
Apr. 20, 2012 (NL) .................................. 2008667
Apr. 20, 2012 (NL) .................................. 2008668

(51) Int. Cl.
*A01F 15/07* (2006.01)
*A01F 15/08* (2006.01)
(52) U.S. Cl.
CPC .......... *A01F 15/0705* (2013.01); *A01F 15/071* (2013.01); *A01F 15/0883* (2013.01); *A01F 2015/074* (2013.01); *A01F 2015/078* (2013.01); *A01F 2015/0735* (2013.01)

(58) Field of Classification Search
CPC .............. A01F 15/071; A01F 15/0883; A01F 15/0705; A01F 2015/0735; A01F 2015/074; A01F 2015/075
USPC ........................ 100/40, 76, 87, 88, 35; 56/341
See application file for complete search history.

(56) References Cited

U.S. PATENT DOCUMENTS

| 4,510,861 | A | 4/1985 | Campbell et al. | |
| 7,171,892 | B2 * | 2/2007 | Viaud ............................. | 100/87 |
| 7,331,280 | B2 * | 2/2008 | Viaud ............................. | 100/87 |
| 7,404,356 | B2 * | 7/2008 | Viaud ............................. | 100/87 |
| 7,640,852 | B1 * | 1/2010 | Anstey et al. .................. | 100/88 |
| 2002/0078674 | A1 | 6/2002 | Lucand et al. | |
| 2012/0204738 | A1 | 8/2012 | Reijersen Van Buuren | |

FOREIGN PATENT DOCUMENTS

| EP | 1214876 A1 | 6/2002 |
| FR | 2368214 A1 | 5/1978 |
| WO | WO 2011/053120 A1 | 5/2011 |

* cited by examiner

*Primary Examiner* — Jimmy T Nguyen
(74) *Attorney, Agent, or Firm* — Birch, Stewart, Kolasch & Birch, LLP

(57) ABSTRACT

A bale forming apparatus and a bale forming method form cylindrical bales. An intake device conveys material into a bale forming chamber surrounded by a bale forming mechanism. A bale in this bale forming chamber is formed by means of the bale forming mechanism. A pivotal guiding member is mounted at a free end of a guiding member arm. The guiding member arm is pivoted in a guiding direction and in a parking direction. This causes the guiding member to be pivoted into a guiding position and into a parking position. An actuator pivots a guiding member arm pivoting element in a pivoting direction that is the guiding direction or the parking direction. This pivoting step causes the guiding member arm to be pivoted in the pivoting direction.

19 Claims, 16 Drawing Sheets

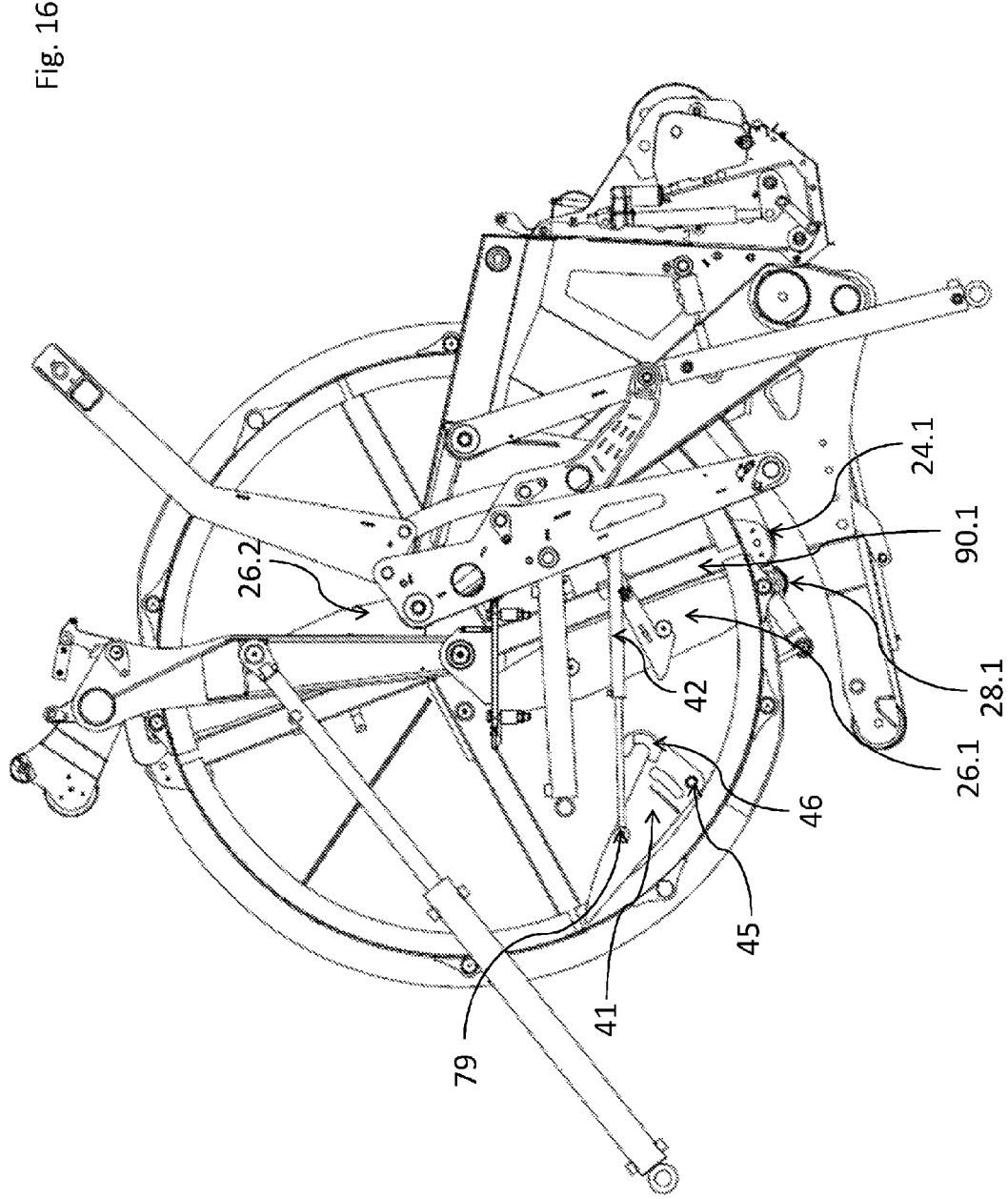

BALE FORMING APPARATUS AND METHOD WITH PIVOTAL GUIDING ELEMENT

BACKGROUND

The present invention relates to a bale forming apparatus and a bale forming method for forming cylindrical bales.

A bale forming apparatus as used for agricultural purposes is an agricultural vehicle to form bales of crop material. The bale forming apparatus usually comprises an intake device to take up crop material from a ground surface and a bale forming device to form a bale from the crop material.

In a known embodiment, the bale forming device comprises at least one endless pressing belt, preferably several parallel endless belts, guided by guiding rollers. An outlet of the intake device is arranged between two guiding rollers so that crop material is fed between the two guiding rollers towards the endless belt(s). Due to the feeding of crop material between the two guiding rollers a bale forming chamber is formed by the belt(s). By further feeding crop material through the outlet the bale forming chamber can be filled until a bale with a desired diameter is obtained.

The bale forming chamber is surrounded by a fixed front housing and a pivotal tailgate of the bale forming apparatus. For forming a bale under pressure the tailgate must be connected with the front housing. Opening of the pivotal tailgate ejects and thereby releases the bale from the bale forming chamber. Before ejecting a bale, this bale must be wrapped into a net or foil. Before the formation of a new bale under pressure can be started, the pivotal tailgate must be closed again.

STATE OF THE ART

WO 2011/053120 A1 and US 2012/0204738 A1 disclose a round baler working in a continuous manner. An endless belt 10 is guided around four moveable guiding elements 11a, 11b, 11c, and 11d and around a fixed guiding element 12 and a tensioning element 13. The four moveable guiding elements 11a, 11b, 11c, 11d are mounted on four arms 15 which in turn are mounted on a rotatable element 16, cf. FIG. 1. Every arm 15 can be rotated by means of an actuator 16. The two moveable guiding elements 11a, 11b form a first pair. The two moveable guiding elements 11c, 11d form a second pair. Every pair can be moved into an intake position, a release position, and a back end support position. This movement is effected by rotating the arms 15 around a horizontal axis through the rotatable element 16. FIG. 1 shows the first pair with the guiding elements 11a, 11b in the intake position near the outlet 8 of an intake device. The baling chamber is formed between these two guiding elements 11a, 11b. After the bale B is created, the first pair is rotated from the intake position into a release position, cf. FIG. 2. The bale B can be ejected. Simultaneously the second pair 11c, 11d is moved into the intake position such that the creation of a second bale B2 can be started before the first bale B is ejected.

PROBLEM, SOLUTION

The problem solved by the invention is to provide a bale forming apparatus and a bale forming method for forming cylindrical bales in a bale forming chamber which chamber is surrounded by a bale forming means wherein the bale forming means is guided by at least one guiding member wherein the guiding member does not inhibit the further processing of a bale formed in the bale forming chamber.

The bale forming apparatus and the bale forming method form cylindrical bales from material.

An intake device conveys material through an outlet into a bale forming chamber being adjacent to the outlet. The bale forming chamber is surrounded by a bale forming means.

This bale forming means is guided by at least one pivotal guiding member. This pivotal guiding member is mounted at a free end of a guiding member arm. This guiding member arm is pivotally mounted and can be pivoted in a guiding direction and in a parking direction.

The pivotal guiding member can be pivoted into a guiding position. In this guiding position the pivotal guiding member guides the bale forming means. In addition the guiding member can be pivoted to a parking position.

An actuator pivots a guiding member arm pivoting element in the guiding direction. The guiding member arm pivoting element being pivoted in the guiding direction causes the guiding member arm to be pivoted in the guiding direction. When the guiding member arm is pivoted in the guiding direction the guiding member mounted at the guiding member arm is pivoted into the guiding position.

Pivoting the guiding member arm in the guiding direction causes the pivotal guiding member to be pivoted into the guiding position. Pivoting the guiding member arm in the parking direction causes the pivotal guiding member to be pivoted into the parking position.

A guiding member arm pivoting element is pivotally mounted and can be pivoted into the guiding direction and into the parking direction. An actuating means pivots this guiding member arm pivoting element in at least one pivoting direction. This pivoting direction is the guiding direction or is the parking direction.

The step that the actuating means pivots the guiding member arm pivoting element in the pivoting direction effects the following steps:

The guiding member arm is pivoted in the pivoting direction, i.e. in the guiding direction or in the parking direction.

The guiding member is pivoted into the corresponding position, i.e. into the guiding position or into the parking position.

The guiding member arm carrying the guiding member is also pivoted in a direction opposite to the pivoting direction. By this pivotal movement the pivotal guiding member is pivoted into the corresponding opposite position. If the pivoting direction is the parking direction, the corresponding position is the parking position and the corresponding opposite position is the guiding position.

The actuating means in cooperation with the guiding member arm pivoting element pivots the guiding member arm in this opposite direction.

ADVANTAGES

Thanks to the invention the run and/or position and/or tension of the bale forming means can be changed during operation. This change is achieved by pivoting the guiding member into the guiding position or into the parking position. In particular this feature enables to provide a bale forming apparatus which can be operated in a continuous manner and a bale forming method for a continuous operation. "Continuous operation" means: The bale forming apparatus needs not to be stopped while a formed bale is made ready for being ejected, e.g. by wrapping the bale into a net or a foil.

Thanks to the invention a bale formed in the bale forming chamber can be stored in a buffer of the bale forming apparatus while being made ready for being ejected. The guiding member is pivoted into the guiding position and contributes to guide the bale forming means such that this bale forming means surrounds a bale forming chamber in which the formation of a new bale from conveyed material is started. If the old bale is ejected, the guiding member is pivoted into the parking position and does not inhibit the formation of the new bale in the bale forming chamber.

The pivotal guiding member enables in an easy way that one segment of the bale forming means surrounds the bale forming chamber adjacent to the outlet. If the bale supporting construction is in the bale supporting position, a further segment of the bale forming means surrounds a bale on the bale supporting construction while the bale is finished. The pivotal guiding member in the guiding position defines and separates these two segments from each other. It is not necessary to provide a specific bale keeping means for keeping a bale being on the bale supporting construction and prevents the bale from falling apart. It is possible to pivot the pivotal guiding member into a parking position while no bale is on the bale supporting construction.

According to the invention the guiding member is mounted on a free end of the guiding member arm. The guiding member arm can be pivoted into two directions (guiding direction and parking direction). Therefore it is not necessary to touch directly the guiding member for pivoting it into the guiding position or into the parking position. In particular the actuating means needs not to be connected directly with the guiding member.

According to the invention the actuating means does not pivot directly the guiding member arm. In contrast the actuating means pivots the guiding member arm pivoting element in the pivoting direction. The pivoted guiding member arm pivoting element pivots and thereby urges the guiding member arm in this pivoting direction. The actuating means pivots the guiding member arm in the opposite direction also by means or in cooperation with the guiding member arm pivoting element. This feature enables to tailor the guiding member arm to the requirements and constrains for carrying and for pivoting the guiding member for the bale forming means.

The guiding member arm pivoting element is arranged between the actuator and the guiding member arm. It suffices to adapt this guiding member arm pivoting element to the requirements and constrains of pivoting the guiding member arm. The guiding member arm pivoting element needs not be adapted to the requirements of guiding the bale forming means. The actuator needs not to be connected directly with the guiding member arm. The guiding member arm pivoting element buffers vibrations and oscillations which may be created by the guiding member arm or by the actuator and inhibits this vibrations and oscillations to have an effect on the other part.

EMBODIMENTS

In one embodiment a distance between the bale forming means and the guiding member being in the parking position occurs. By this the guiding member in the parking position does not influence the shape of the bale forming chamber surrounded by the bale forming means. The guiding member in the parking position is no obstacle for forming a bale in the bale forming chamber. The bale forming means is guided by further guiding members.

In one embodiment the actuator means pivots the guiding member arm pivoting element in the guiding direction as well as in the parking direction. The guiding member arm is connected with the guiding member arm pivoting element and is pivoted by the guiding member arm pivoting element in the same direction.

In a further embodiment the actuator means comprises an arm actuator. This arm actuator actively pivots the guiding member arm pivoting element in the pivoting direction.

According to this further embodiment the pivotal guiding member arm is pivoted in a direction opposite to the pivoting direction. The guiding member is pivoted to the corresponding opposite position. If the pivoting direction is the parking direction, the guiding member is pivoted into the guiding position as the corresponding opposite position.

In one embodiment the guiding member arm is temporally connected with a further pivotal member by means of a switchable locking device. The actuating means comprises a pivotal member actuator. This pivotal member actuator pivots the further pivotal member in the pivoting direction. As long as the guiding member arm is connected with the further pivotal member, the guiding member arm is also pivoted in the pivoting direction. This embodiment does not require a drive for the guiding member arm. In contrast the guiding member arm can be implemented as a purely passive lever arm.

For pivoting the guiding member arm in the opposite direction the guiding member arm is released from the guiding member arm pivoting element. The actuator arm or a retaining device pivots the guiding member arm with respect to the further pivotal member in the opposite direction. The retaining device can also be implemented as a purely passive element, i.e. as a pin or a spring or a rubber element.

This embodiment only requires an arm actuator which can pivot the guiding member arm pivoting element in one direction, namely the pivoting direction. The arm actuator can be implemented by a means only acting in one direction, e.g. a hydraulic cylinder which can only be expanded or can only be retracted.

In one embodiment the guiding member arm can be connected with the guiding member arm pivoting element by means of a locking device. This connection can be released again. The locking device may comprise a pin and a hook engaging the pin. The pin maybe mounted at the guiding member arm and the hook is a part of the guiding member arm pivoting element. Or the pin is a part of the guiding member arm pivoting element and the hook is connected with the guiding member arm.

Preferably the guiding member arm pivoting element can be pivoted around the pivoting element pivoting axis. Different embodiments are possible how this pivoting element pivoting axis is situated with respect to the guiding member arm.

In one embodiment the guiding member arm is situated upstream of the pivoting element pivoting axis if seen in the parking direction. The guiding member arm pivoting elements pulls the guiding member arm in the parking direction and pushes the guiding member arm in the guiding direction. The actuator pivots the guiding member arm pivoting element in both directions.

In a further embodiment the guiding member arm is situated downstream of the pivoting element pivoting axis if seen in the parking direction. The guiding member arm pivoting element pushes the guiding member arm in the parking direction and pulls it in the guiding direction. Again the actuator pivots the guiding member in both directions.

According to one embodiment which is just mentioned, the guiding member arm pushing element pushes the guiding member arm in the guiding direction. This embodiment enables with high reliability to pivot the guiding member into the guiding position against the resilient force of the bale forming means.

Preferably the bale forming means is guided by the pivotal guiding member and by several further guiding members. Some further guiding members may also be pivotal, in particular for tensioning the bale forming means and for adapting it to the varying size of a bale in the bale forming chamber. The bale forming means may comprise pressing belts, pressing rollers and/or chain-like aprons. A guide member may comprise a roller.

DESCRIPTION OF EMBODIMENT

In the following an embodiment of the invention is described by means of the following figures:

FIG. 8 to FIG. 16 show this pivotal guiding roller to be pivoted back into the parking position.

Figure 1:
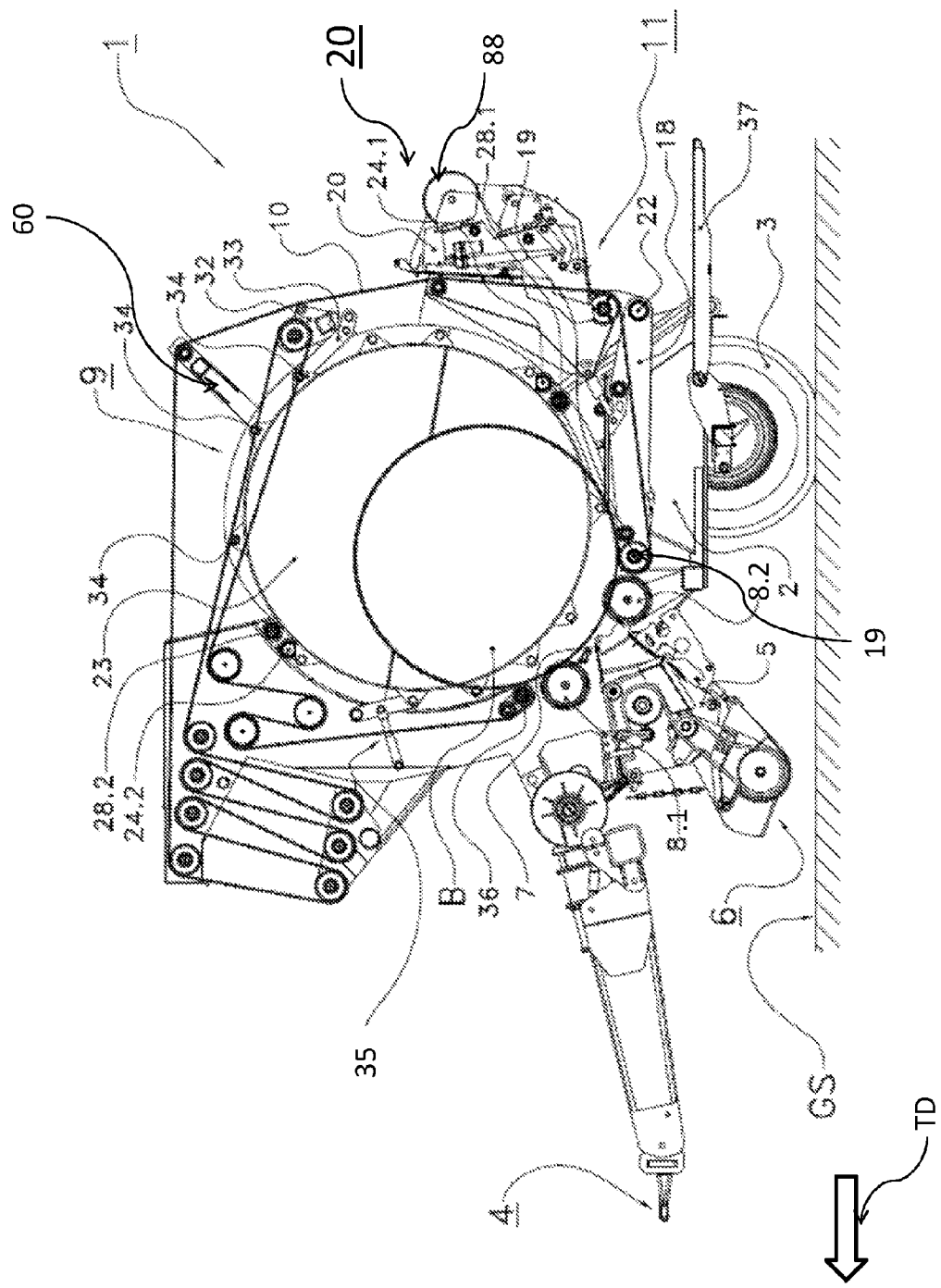
FIG. 1 shows a cross section of the bale forming apparatus with the bale supporting construction in the bale receiving position and with a bale in the bale forming chamber.

FIG. 1 shows a bale forming apparatus, generally indicated with reference numeral 1. The bale forming apparatus 1 comprises a frame 2 which is supported by wheels 3. The bale forming apparatus 1 is configured to be connected at its front end 4 to a pulling vehicle, for instance to a tractor. The bale forming apparatus 1 is adapted for being pulled in a travelling direction TD, that is in FIG. 1 from right to left.

The bale forming apparatus 1 comprises an intake device 5 to take in crop material, such as silage, grass, hay, from a ground surface GS. The intake device 5 comprises an inlet 6 and an outlet 7. At opposite sides of the outlet 7 two stationary supporting rollers 8.1, 8.2 are provided. The rotating axes of these two supporting rollers 8.1, 8.2 are perpendicular to the drawing plane of FIG. 1.

Via the inlet 6 crop material is taken from the ground surface GS and transported to the outlet 7. A drum provided at the inlet 6 may be provided with tines to facilitate the picking up of crop material. The tines can be mounted in a flexible manner such that they can adapt to the ground profile.

The frame 2 comprises a front housing part. A bale forming device 9 is arranged on the frame 2 to form bales of crop material. The bale forming device 9 comprises at least one endless belt 10 and a number of guiding rollers supporting the endless belt(s) 10. Preferably several belts 10 are arranged parallel to each other. The belt(s) 10 operate as the bale forming means. A tensioning device is provided to maintain tension in the belt(s) 10.

The back end of the bale forming apparatus 1 is provided with a tailgate 11 which is constructed to support in a support area a bale B arranged on the tailgate 11. The tailgate 11 is pivotal about a rotation axis 16, cf. FIG. 2 to FIG. 5. In the preferred embodiment the tailgate 11 is at least movable (pivotal) between a bale receiving position, a bale supporting position and a bale ejecting position. This tailgate 11 serves as the bale supporting construction.

The tailgate 11 comprises
  a tailgate frame 17 and
  a tailgate bottom 18 carrying a tailgate bottom roller 19.

The tailgate bottom 18 can be pivoted with respect to the tailgate frame 17 around a pivoting axis 22.

In FIG. 1 the tailgate 11 is shown in the bale receiving position. This bale receiving position is also the position which the tailgate 11 takes during the formation of a bale and is also the transport position, i.e. the position in which the tailgate 11 is preferably positioned when the bale forming apparatus is not used to create bales but is pulled over a public street, e.g.

The bale forming apparatus 1 is configured to hold a bale in a first bale position and a second bale position. The first bale position is arranged next to the outlet 7 of the intake device 5, and the second bale position is spaced away from the outlet 7. FIG. 1 shows a bale B in the first bale position.

In the first bale position, the bale formed or being formed is mainly supported by the two stationary supporting rollers 8.1, 8.2 arranged at opposite sides of the outlet 7 of the intake device 5, but may also partially be supported by the tailgate 11. The bale in the first bale position is in a bale forming chamber and is surrounded by the bale forming means 10.

The second bale position is defined by the bale supporting position of the tailgate 11. Thus, in this bale supporting position, the tailgate 11 holds a bale in the second bale position. This second bale position is positioned such that a new bale can be at least partially formed in the first bale position before the bale in the second bale position is ejected by the bale forming apparatus 1. Therefore the bale forming apparatus 1 carries at the same time a complete bale B on the bale supporting construction 11 and an increasing bale B' in the bale forming chamber adjacent to the outlet 7, cf. FIG. 2.

A bale can be transported from the first bale position to the second bale position by the following consecutive steps:
  moving the bale from the first bale position away from the outlet 7 and onto the tailgate 11 arranged in the bale receiving position and
  subsequently moving the tailgate 11 with the bale B from the bale receiving position into the bale supporting position.

Figure 2:
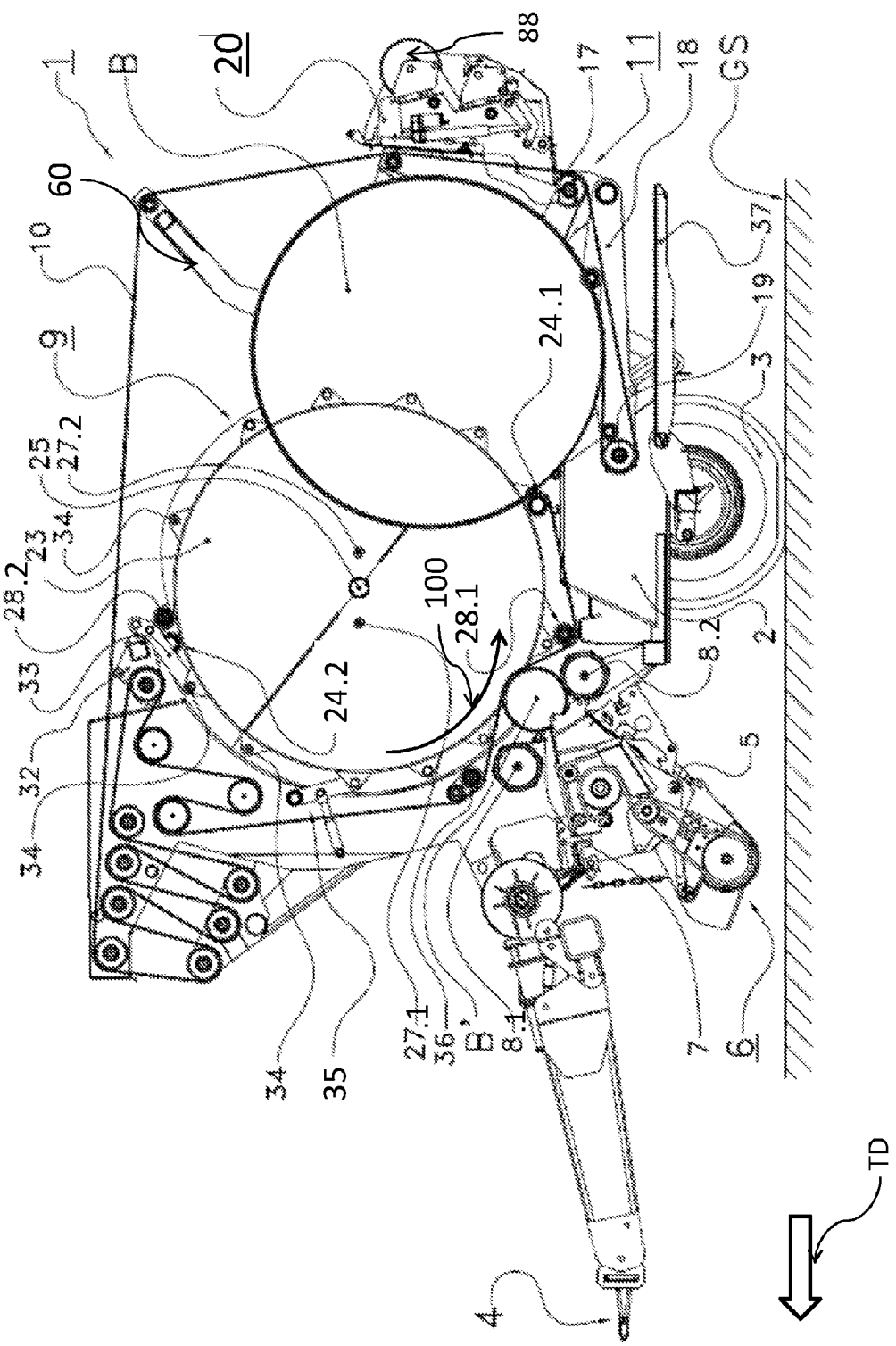
FIG. 2 shows the bale forming apparatus of FIG. 1 with the bale supporting construction in the bale supporting position and a new bale increasing in the bale forming chamber.

FIG. 2 shows the tailgate 11 carrying the bale B in the bale supporting position. The bale B is in the second bale position. The bale B has been pushed by the pushing element 24.1 away from the outlet 7 onto the tailgate bottom 8 in a pushing direction opposite to the travelling direction TD. The pushing roller 24.1 and a further pushing roller 24.2 are rigidly connected with a left supporting disk 23 and a corresponding right supporting disk (not shown). Both supporting disks 23 can be rotated around the disk rotating axis 25 in rotating direction 100.

The stationary guiding roller 26 and the pivotal guiding roller 28.1 are arranged on two sides of the outlet 7. The segment of the belt(s) 10 between these two rollers 28.1, 36 surround a bale forming chamber adjacent to the outlet 7. A new bale B' increases in the bale forming chamber.

Figure 3:
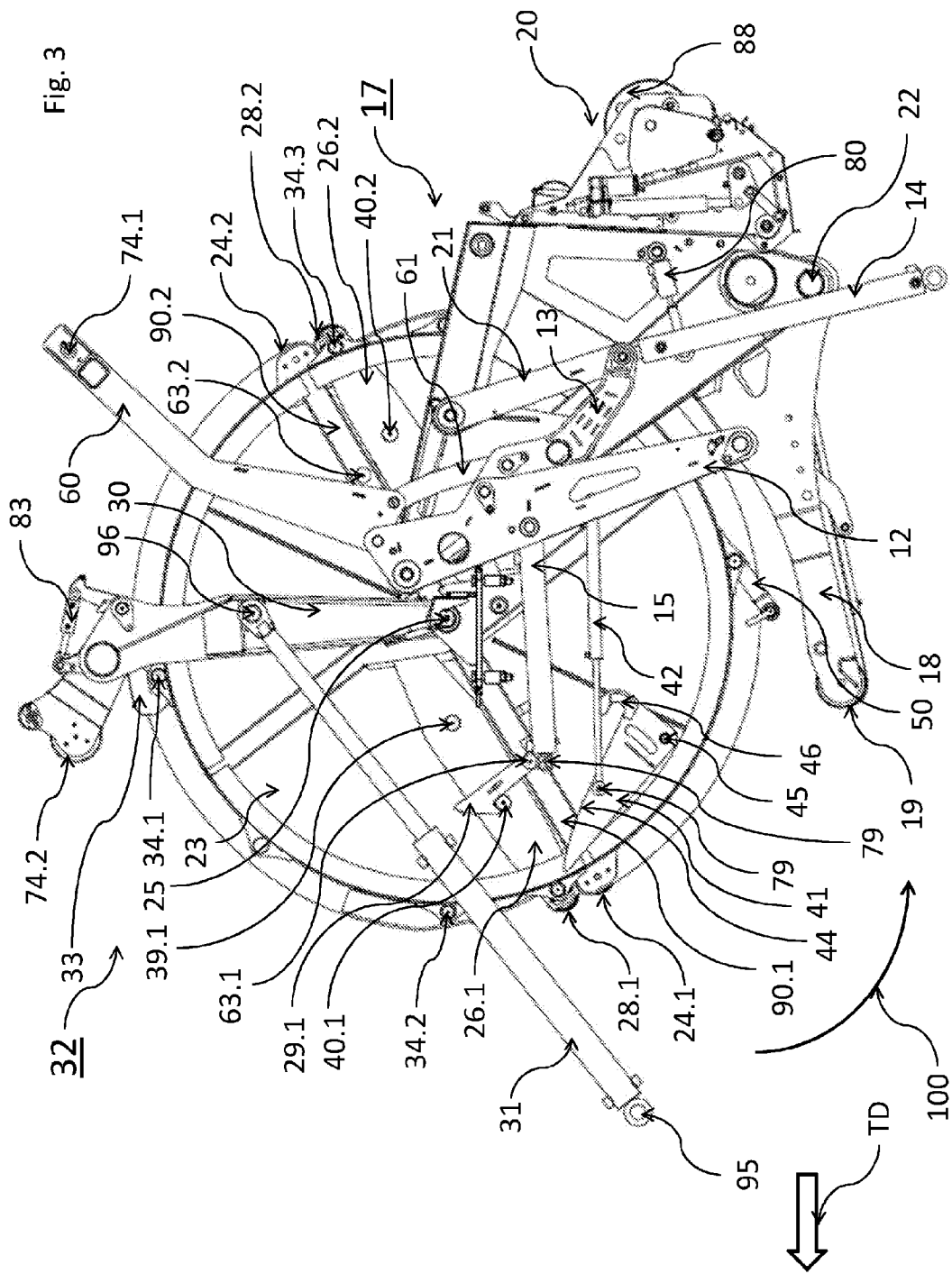
FIG. 3 and FIG. 4 show a detailed view of relevant parts of the bale forming apparatus with and the bale supporting construction in the bale receiving position and both pivotal guiding rollers in the parking position.

FIG. 3 shows a side view of the baler with more details. In this embodiment several pressing belts 10 are guided around several guiding rollers.

Among these guiding rollers are following rollers:
  a guiding roller 74.1 mounted on the free end of a tensioning arm 60,
  a guiding roller 74.2 mounted at the free end of an actuator arm 30,
  a tailgate bottom roller 19 mounted at the free end of a tailgate bottom 18,
  a pivotal guiding roller 28.1 mounted at the free end of a swing arm 26.1,
  a pivotal guiding roller 28.2 mounted at the free end of a further swing arm 26.2.

The pressing belt(s) 10 are only temporally guided around the pivotal guiding roller 28.1 and only temporally guided around the pivotal guiding roller 28.2. All these guiding rollers exert a sufficient tension on the pressing belts 10 in the case of a growing bale surrounded by the pressing belts 10 and also in the case that a bale is dropped.

The embodiment of the invention refers to the pivotal guiding rollers 28.1, 28.2. Every pivotal guiding roller 28.1, 28.2 can be pivoted into a guiding position in which it contributes to tensioning the pressing belts 10 and into a parking position in which the pivotal guiding roller 28.1, 28.2 is spaced apart from the pressing belts 10 and does not touch them. Every pivoting guiding roller 28.1, 28.2 serves as a pivotal guiding member in the sense of the claims.

Figure 4:
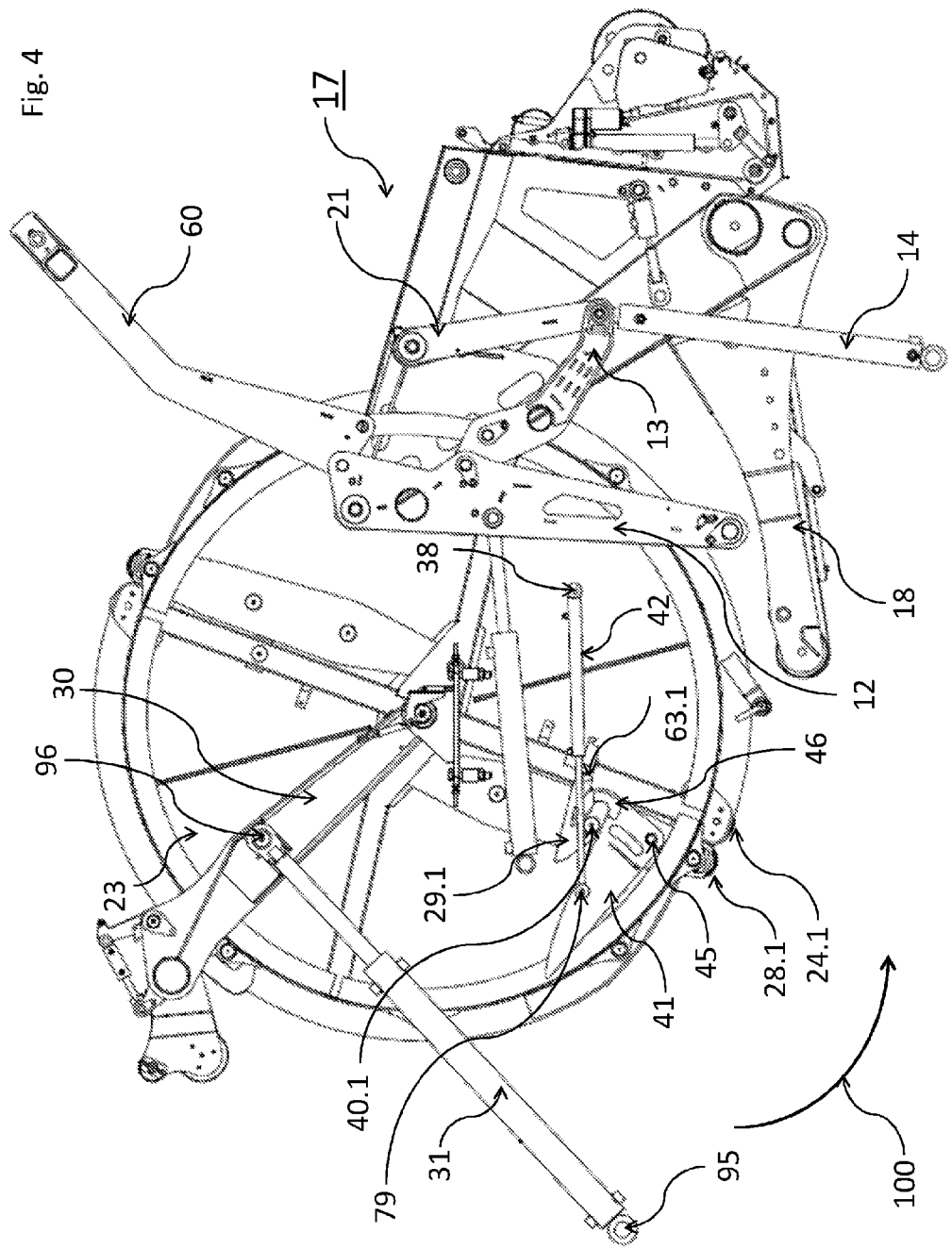
Figure 5:
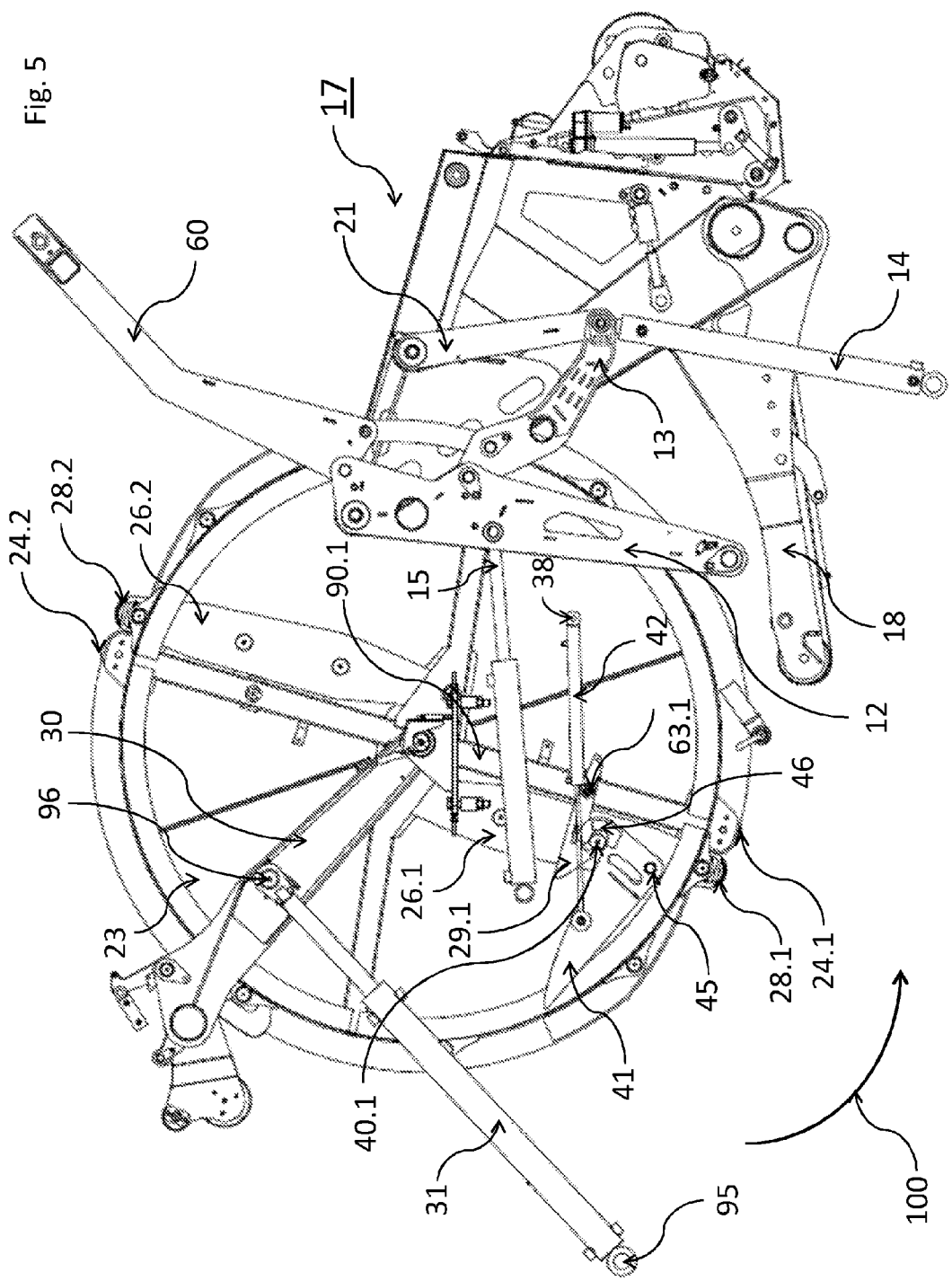
FIG. 5 to FIG. 7 show the bale forming apparatus of FIG. 3 where one pivotal guiding roller is pivoted into the guiding position and the bale supporting construction is pivoted into the bale supporting position.
Figure 6:
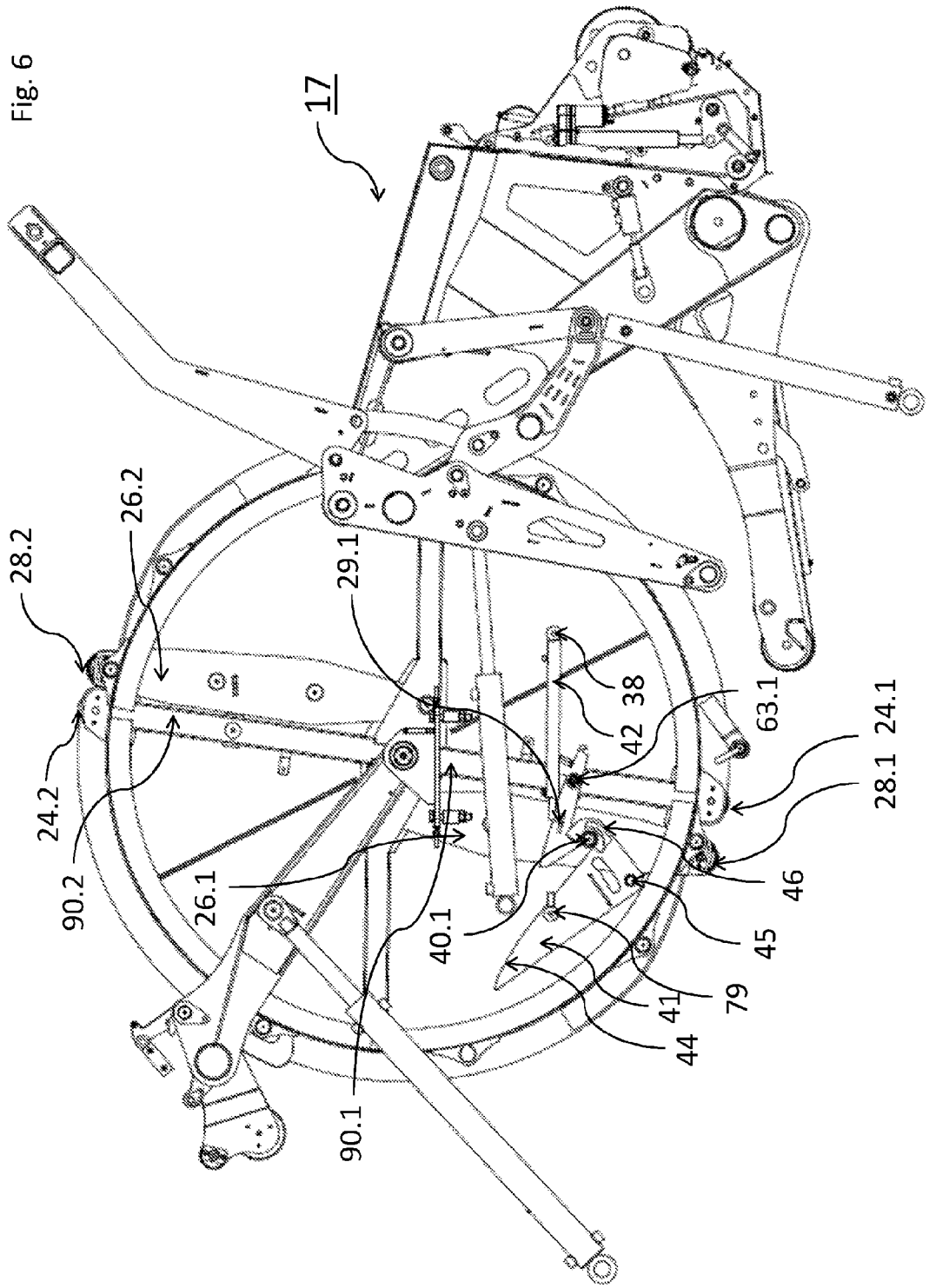
Figure 7:
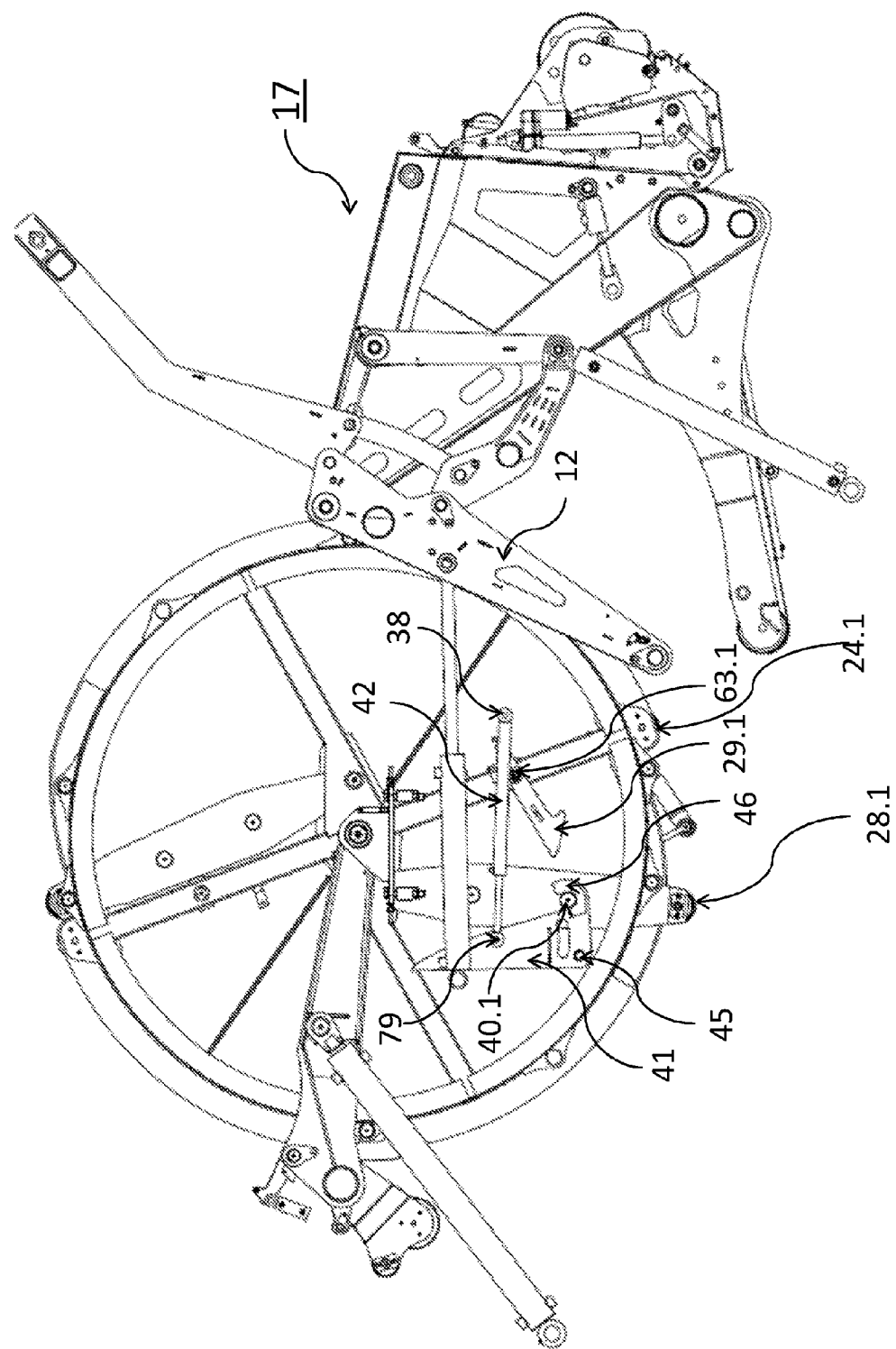

FIG. 3 and FIG. 4 show both pivotal guiding rollers 28.1, 28.2 in the parking position. FIG. 5, FIG. 6 and FIG. 7 show the step of pivoting the guiding roller 28.1 into the guiding position. FIG. 8 to FIG. 16 show the step of pivoting the guiding roller 28.1 from the guiding position back into the parking position.

For pivoting the pivotal guiding roller 28.1 into the guiding position the swing arm 26.1 carrying the guiding member 28.1 is pivoted in a guiding direction. In the embodiment this guiding direction is parallel to the travelling direction TD, cf. FIG. 4 to FIG. 7. For pivoting the pivotal guiding roller 28.1 into the parking position the swing arm 26.1 carrying the guide member 28.1 is pivoted in a parking direction. This parking direction is opposite to the travelling direction TD, cf. FIG. 8 to FIG. 16.

In the embodiment the pivoting direction in the sense of the claims is the parking direction. This parking direction is opposite to the travelling direction TD. The guiding direction is parallel to the travelling direction TD and opposite to the pivoting direction. The pivotal guiding rollers 28.1, 28.2 belong to the pivotal guiding member of the embodiment.

The swing arm 26.1 with the guiding roller 28.1 can be pivoted around a pivoting axis 27.1. The swing arm 26.2 with the guiding roller 28.2 can be pivoted around a further pivoting axis 27.2. Both pivoting axes 27.1, 27.2 are spaced apart from a disk rotating axis 25. This fact can best be seen in FIG. 1 and FIG. 2.

FIG. 1 to FIG. 16 show a left supporting disk 23 which can be rotated around the disk rotating axis 25 anti-clockwise in the rotating direction 100. A corresponding right supporting disk can also be rotated around the disk rotating axis 25 in the rotating direction 100.

In one embodiment the disk rotating axis 25 rigidly connects the two supporting disks. In a further embodiment the supporting discs are not connected by an axle along the rotating axis but by the guiding rollers 28.1, 28.2 and the pushing rollers 24.1, 24.2 (see below). As the pivoting axes 27.1, 27.2 are spaced apart from the disk rotating axis 25, the guiding rollers 28.1, 28.2 can be pivoted into the different distances to the circumferential surface of the supporting disk 23.

In the situation of FIG. 3 and FIG. 5 the swing arm 26.1 is connected with a supporting arm 90.1. The swing arm 26.2 is connected with a supporting arm 90.2. This connection is effected by means of two locking pawls 29.1, 29.2. The locking pawl 29.1 is pivotally connected with the supporting arm 90.1 in a pivoting axis 36.1. The locking pawl 29.2 is pivotally connected with the supporting arm 90.2 in a pivoting axis 63.2. In FIG. 3 and FIG. 4 both locking pawls 29.1, 29.2 are in a locking position. The two supporting arms 90.1, 90.2 operate as spokes of the supporting disk 23 and are therefore pivoted around the disk rotating axis 25 in the rotating direction 100 if the supporting disk 23 is rotated. The locking pawls 29.1, 29.2 are also moved together with the supporting disk 23. At the free end of the supporting arm 90.1 (the end opposite to the disk rotating axis 25) a pushing roller 24.1 is mounted. At the free end of the supporting arm 90.2 the pushing roller 24.2 is mounted. The guiding rollers 28.1, 28.2 and the pushing rollers 24.1, 24.2 also rigidly connect the two supporting disks 23.

FIG. 3 shows the following further parts:

an actuator arm 30 and a hydraulic double-acting actuating cylinder 31 which pivot the left supporting disk 23 around the disk rotating axis 25, a coupling device 32 with a disk engaging hook 33, several corresponding coupling pins 34.1, 34.2, 34.3 mounted at the supporting disk 23 and a disk locking cylinder 83, the tailgate 11 comprising a tailgate frame 17 with parts 17.1, 17.2, 17.3 and the pivotal tailgate bottom 18 being pivotally connected with the tailgate frame 17 in a pivoting axis 22, a wrapping device 20 with a reel 88 for wrapping material (net, foil, e.g.), a lever arrangement with a first tailgate lever arm 12, a second tailgate lever arm 13, a third tailgate lever arm 21, and a tensioning lever arm 61, a hydraulic double-acting horizontal tailgate cylinder 15 for pivoting the first tailgate lever arm 12, a hydraulic double-acting vertical tailgate cylinder 14 for pivoting the third tailgate lever arm 21, a hydraulic horizontal tailgate bottom cylinder 80 for pivoting the tailgate bottom 18 around the pivoting axis 22, a flipper element 50 which prevents the supporting disk 23 from rotating opposite to the rotating direction 100.

An actuating cylinder 31 is at its left side pivotally connected with the frame 2 in a stationary pivoting axis 95. At its right side the actuating cylinder 31 is pivotally connected with the actuator arm 30 in a pivoting axis 96. This actuating cylinder 31 is double-acting.

The following parts are used for pivoting the guiding rollers 28.1, 28.2 into the guiding position or into the parking position:

the swing arm 26.1 which carries the pivotal guiding roller 28.1 and can be pivoted around the pivoting axis 27.1, the swing arm 26.2 which carries the pivotal guiding roller 28.2 and can be pivoted around the pivoting axis 27.2, a swing arm pivoting hook 41 which can be pivoted in both directions around a stationary pivoting axis 45 and which has an arcuate edge 44 facing towards the disk rotating axis 25, a hydraulic horizontal swing arm hook cylinder 42 which is pivotally connected with the swing arm pivoting hook 41 in a pivoting axis 79 and with a stationary pivoting axis 38, a coupling pin 40.1 mounted on the swing arm 26.1, a coupling pin 40.2 mounted on the swing arm 26.2, a shifting pin 39.1 mounted on the swing arm 26.1 between the pivoting axis 27.1 and the coupling pin 40.1, a corresponding shifting pin on the swing arm 26.2, a catching and locking hook 46 mounted at the swing arm pivoting hook 41.

The swing arm pivoting hook 41 serves as the guiding member arm pivoting element in the sense of the claims.

In the embodiment several hydraulic double-acting cylinders are used. It is possible to use alternative embodiments of actuating means, e.g. electrical cylinders or electrical motors or pneumatic actuators.

In the embodiment the stationary pivoting axis 45 of the swing arm pivoting hook 41 is—seen in the pushing direction—situated downwards from the swing arm 26.1, i.e. behind the swing arm 26.1 when the swing arm 26.1 is pivoted in the guiding direction and by this the pivoted guiding roller 28.1 is pivoted into the guiding position, cf. FIG. 5 to FIG. 7.

The supporting disk 23 is mounted such that it can be rotated in the rotating direction 100 around the disk rotating axis 25. The pivoting axis 27.1 of the swing arm 26.1 is spaced-apart from the disk rotating axis 25. The pivoting axis 27.2 of the swing arm 26.2 is also spaced-apart from the disk rotating axis 25. The disk rotating axis 25 is situated between the two pivoting axes 27.1, 27.2 what can best be seen in FIG. 2.

FIG. 3 shows a situation where a bale is situated between the left supporting disk 23 and the corresponding right supporting disk. This bale B is also arranged between the pushing roller 24.1 and the tailgate 11. The supporting disks 23 are now rotated around the disk rotating axis 25 in the rotating direction 100.

This rotation is effected by the actuating cylinder 31 pivoting the actuator arm 30. The step of rotating the supporting disks 23 causes the supporting arms 90.1, 90.2 to be rotated around the disk rotating axis 25. The step of rotating the supporting arm 90.1 around the disk rotating axis 25 causes the pushing element 24.1 to push the bale B away from the outlet 7 and onto the tailgate 11. The pushing roller 26.2 is not used for pushing this bale but for pushing the next bale B', cf. FIG. 2. After this pushing step the bale B is carried by the tailgate bottom 18 and is laterally supported by the tailgate frame 17.

FIG. 4 and FIG. 5 show two intermediate positions of the bale B while the pushing roller 24.1 pushes the bale onto the tailgate 11. FIG. 6 shows a position after the bale B has entirely being pushed onto the tailgate 11. The horizontal tailgate cylinder 15 and the vertical tailgate cylinder 14 are expanded and pivot the lever arrangement 12, 13, 21 such that the tailgate 11 is pivoted away from the supporting disks 23. The pushed bale B also contributes to pivot the tailgate 11 away from the outlet 7. The bale B is carried by the tailgate bottom 18.

FIG. 3 and FIG. 5 show a situation where the swing arm 26.1 is connected with the supporting arm 90.1 by means of the locking pawl 29.1 which engages the coupling pin 40.1. As the supporting arm 90.1 operates as a spoke of the left supporting disk 23 and as the supporting disk 23 is rotated around the disk rotating axis 25, the connected swing arm 26.1 is rotated around the pivoting axis 27.1.

The coupling pin 40.1 which is mounted on the swing arm 26.1 is moved towards the catching and locking hook 46 mounted at the swing arm pivoting hook 41. This movement is effected by rotating the supporting disks 23 with the supporting arm 90.1. The transition from FIG. 4 to FIG. 5 shows how the coupling pin 40.1 is caught by the catching and locking hook 46.

In FIG. 6 the pivotal guiding roller 28.1 is in an intermediate position between the parking position (cf. FIG. 3) and the guiding position. FIG. 7 shows a situation where the guiding roller 28.1 is entirely pivoted into the guiding position.

A comparison of FIG. 3 to FIG. 5 with FIG. 7 shows two further differences:

The swing arm 26.1 is separated from the supporting arm 90.1 for the pushing roller 24.1, i.e. an angle between these two arms 26.1, 90.1 occurs.

The distance between the circumferential surface of the supporting disk 23 and the guiding roller 28.1 is increased. The pivotal guiding roller 28.1 protrudes for a larger amount (distance).

In FIG. 7 the catching and locking hook 46 engages the coupling pin 40.1. As the swing arm 26.1 with the coupling pin 40.1 was shifted in the guiding direction, the coupling pin 40.1 hits the catching and locking hook 46. In FIG. 7 the swing arm pivoting hook 41 is connected with the swing arm 26.1 via the catching and locking hook 46 which engages the coupling pin 40.1 mounted on the swing arm 26.1.

As just described and is shown in the sequence from FIG. 3 to FIG. 7, the pivotal guiding roller 28.1 is pivoted into the guiding position. The swing arm 26.1 is pivoted with respect to the supporting arm 90.1 in the guiding direction parallel to the travelling direction TD and opposite to the pivoting direction and around the pivoting axis 27.1. By this pivoting step the swing arm 26.1 is separated from the supporting arm 90.1. This pivotal movement of the swing arm 26.1 is effected by releasing the established connection between the catching and locking hook 46 and the coupling pin 40.1 and by continuing the pivotal movement of the supporting arm 90.1. The swing arm pivoting hook 41 with the catching and locking hook 46 inhibits the supporting arm 90.1 from pulling the swing arm 26.1 further towards the tailgate 11.

In addition the locking pawl 29.1 is released from the coupling pin 40.1. In one embodiment the coupling and locking hooks 46 lifts the locking pawl 29.1 by pivoting the locking pawl 29.1 around the pivoting axis 63.1 such that the locking pawl 29.1 does no longer engage the coupling pin 40.1, cf. FIG. 5 to FIG. 7. This pivotal movement is supported by the swing arm hook cylinder 42. This swing arm hook cylinder 42 has two functions:

On the one hand the swing arm hook cylinder 42 rotates and therefore pivots the swing arm pivoting hook 41 around the stationary pivoting axis 45. The swing arm hook cylinder 42 can be extracted and can be extended and can be retracted and can thereby rotate the swing arm pivoting hook 41 in both directions.

On the other hand the swing arm hook cylinder 42 dampens a pivotal movement of the swing arm pivoting hook 41 towards the stationary pivoting axis 38. This dampening effect is effected when the moved coupling pin 40.1 hits the catching and locking hook 46.

In one embodiment the swing arm hook cylinder 42 further pivots the locking pawl 29.1 around the pivoting axis 63.1 such that the pivoted locking pawl 29.1 does no longer engage the coupling pin 40.1.

FIG. 4, FIG. 5 and FIG. 6 demonstrate how the catching and locking hook 46 hits the coupling pin 40.1. The swing arm hook cylinder 42 dampens the rotation of the swing arm pivoting hook 41. The transition from FIG. 6 to FIG. 7 shows that the swing arm hook cylinder 42 is retracted and the pivoting axis 79 is moved towards the stationary pivoting axis 38. Nevertheless the swing arm hook cylinder 42 urges the connected swing arm pivoting hook 41 to pivot away from the supporting arm 90.1. This urges the swing arm 26.1 to be pivoted away from the supporting arm 90.1 in the guiding direction as the swing arm 26.1 is coupled with the swing arm pivoting hook 41 via the catching and locking hook 46 and the coupling pin 40.1. In an alternative embodiment only the damping effect of the swing arm hook cylinder 42 is used. In a further embodiment an alternative damping means can be used in place of the cylinder 42, e.g. a spring or a rubber element.

FIG. 7 shows the tailgate 11 in a bale supporting position. The bale B (not shown in FIG. 3 to FIG. 16) is carried on the tailgate bottom 18. The formation of a new bale B' is started in a bale forming chamber adjacent to the outlet 7, cf. FIG. 2.

Figure 8:
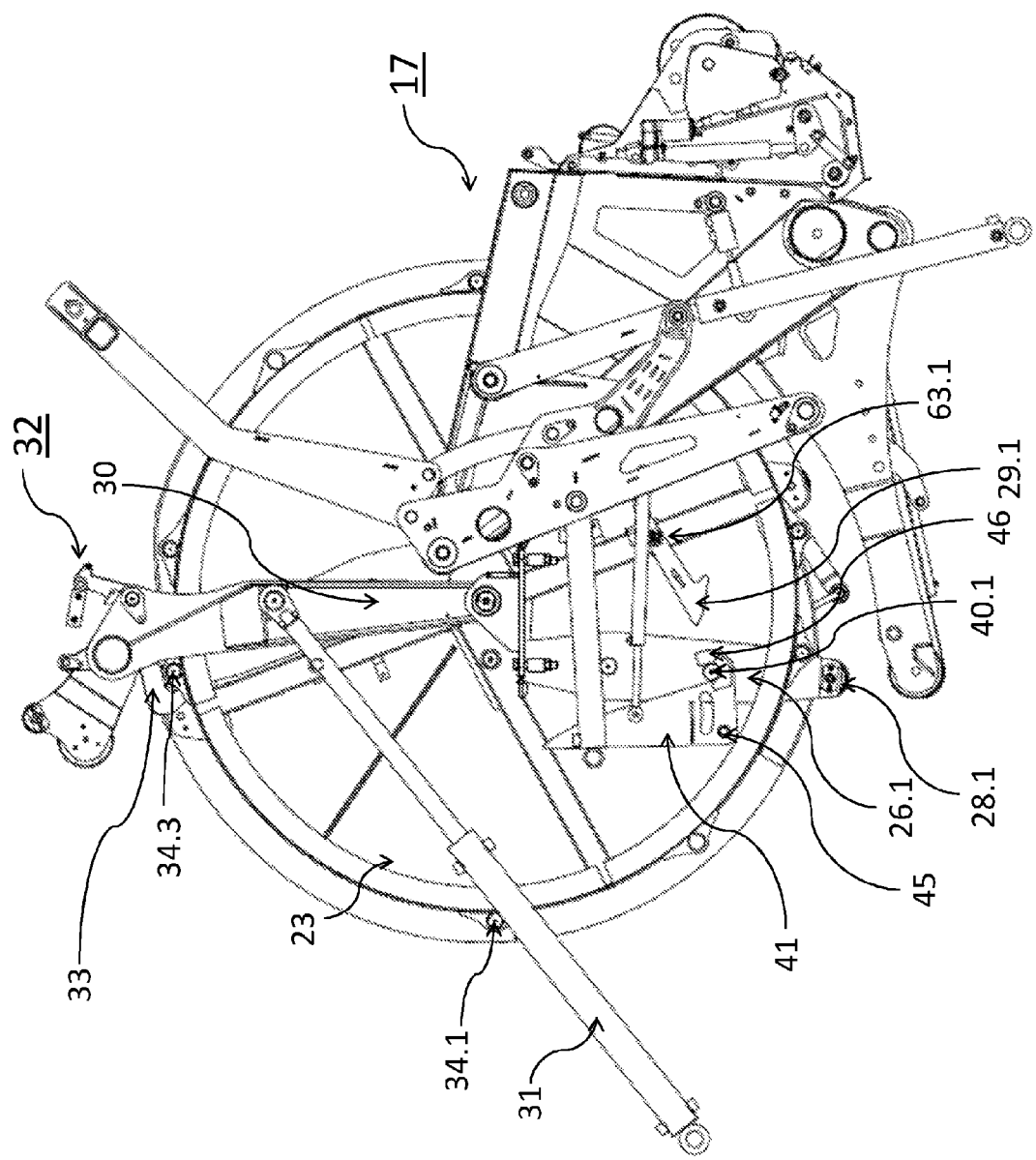
Figure 9:
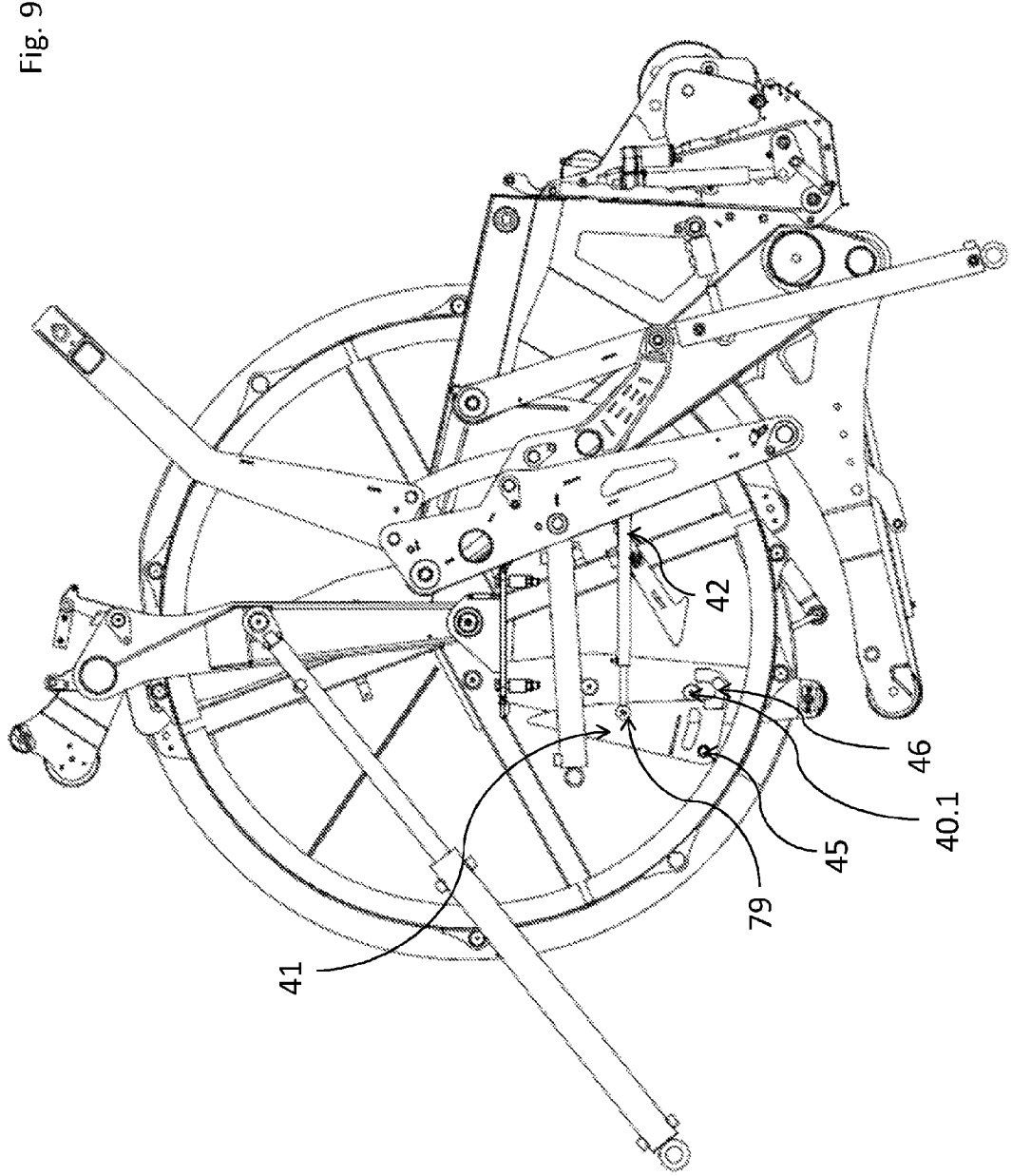

The tailgate 11 is further pivoted and releases the "old" bale B (not shown). Afterwards the tailgate 11 is pivoted back towards the outlet 7. FIG. 8 shows a position where the tailgate 11 has released the old bale B and is ready for receiving the new bale B'. The guiding roller 28.1 is still in the guiding position, the other guiding roller 28.2 still in the parking position.

Now the swing arm 26.1 is pivoted back into the parking direction such that the guiding roller 28.1 is pivoted back into the parking position. For doing so the swing arm pivoting hook 41 pushes and shifts the swing arm 26.1 towards the supporting arm 90.1 and thereby in the parking direction. This step is shown in the sequence from FIG. 8 to FIG. 16. In the embodiment this parking direction is the pivoting direction.

As can be seen in FIG. 8 the swing arm 26.1 is arranged between the pivoting axis 45 of the swing arm pivoting hook 41 and the supporting arm 90.1. The coupling pin 40.1 is still engage by the catching and locking hook 46.

For pushing the swing arm 26.1 the swing arm hook cylinder 42 retracts and pivots the swing arm pivoting hook 41 around the stationary pivoting axis 45 in the pivoting direction towards the cylinder pivoting axis 38 and thereby towards the supporting arm 90.1. The arcuate edge 44 of the swing arm pivoting hook 41 moves along the shifting pin 39.1 rigidly mounted on the swing arm 26.1 between the coupling pin 40.1 and the pivoting axis 27.1. A lever between the pivoting axis 27.1 and the shifting pin 39.1 occurs. The swing arm 26.1 is rotated around the pivoting axis 27.1 by this lever.

FIG. 8 shows the situation before starting the pivotal movement. The locking pawl 29.1 is currently in the release position and therefore not used. The pivotal movement of the swing arm pivoting hook 41 around the pivoting axis 45 first shifts the catching and locking hook 46 away from the coupling pin 40.1, cf. FIG. 9.

Figure 10:
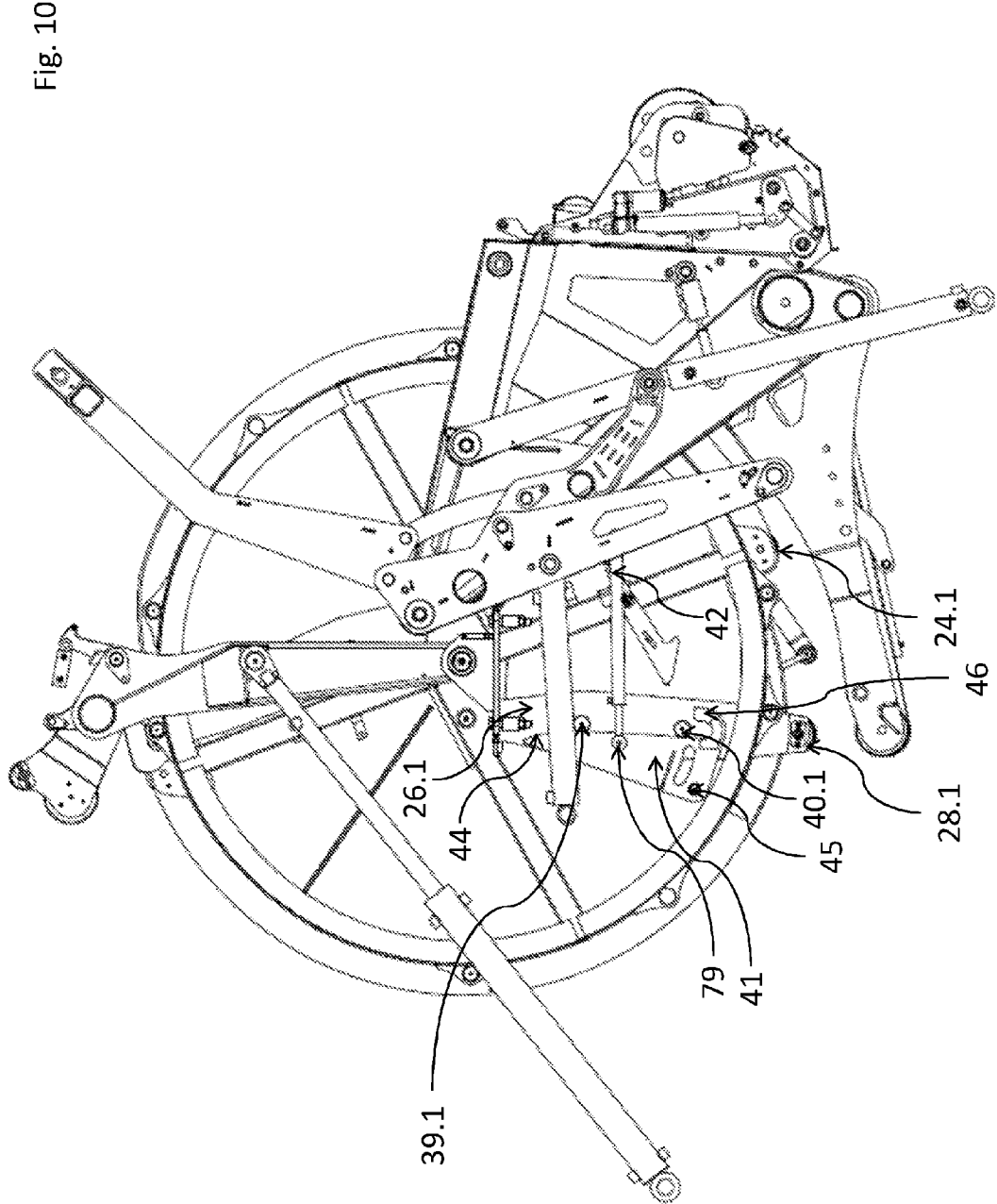

As the swing arm pivoting hook 41 is further pivoted, the arcuate edge 44 reaches the shifting pin 39.1, cf. FIG. 10.

Figure 11:
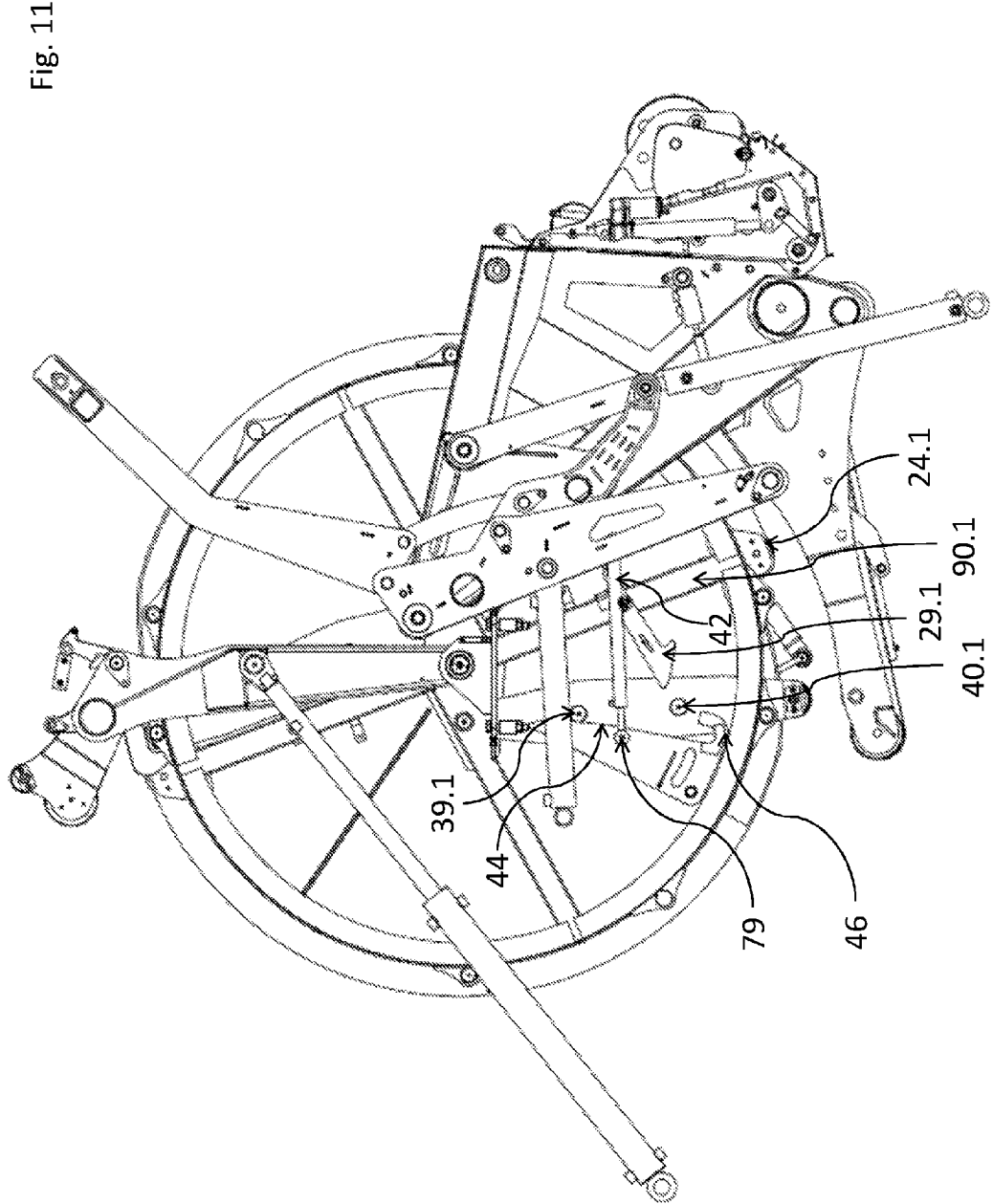

The arcuate edge 44 shifts the shifting pin 39.1 in the pivoting direction towards the supporting arm 90.1 and thereby towards the tailgate 11, cf. FIG. 11. This causes the swing arm 26.1 to be pivoted around the pivoting axis 27.1 towards the tailgate 11 and towards the supporting arm 90.1.

Figure 12:
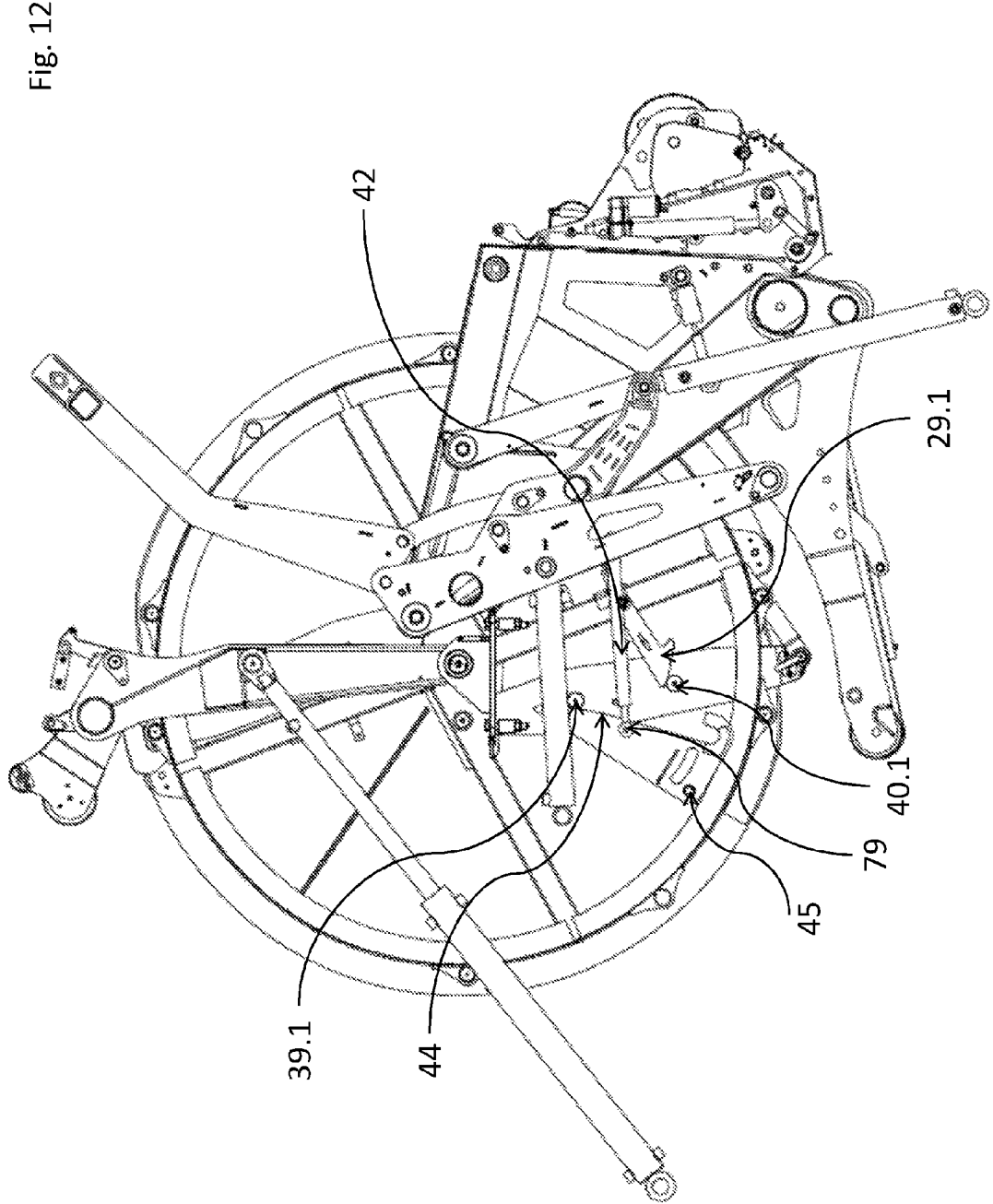

As the swing arm 26.1 is further pivoted, the coupling pin 40.1 reaches the nose of the locking pawl 29.1, cf. FIG. 12. The arcuate edge 44 still shifts the shifting pin 39.1.

Figure 13:
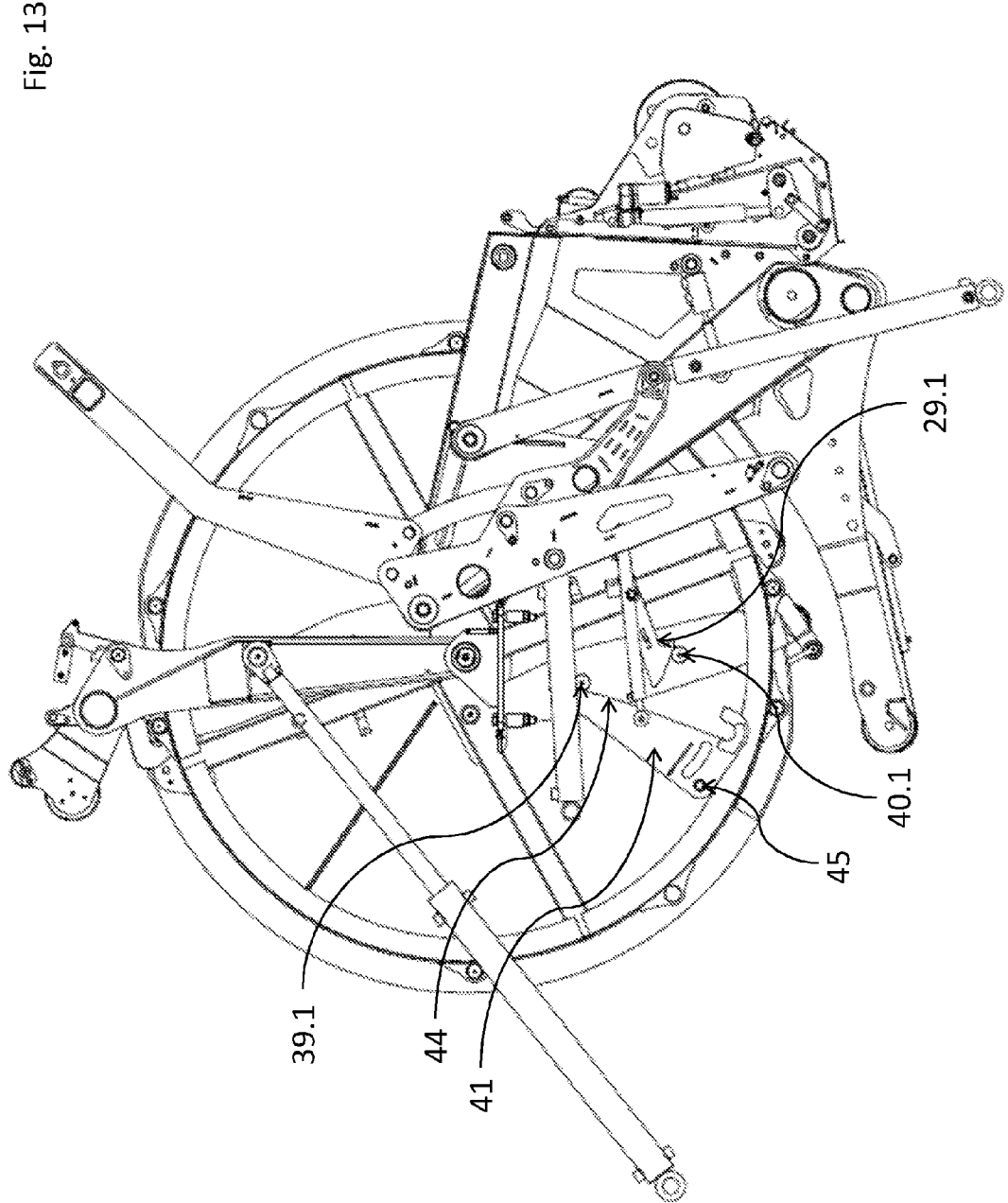

The coupling pin 40.1 moves along the free edge of the locking pawl 29.1, cf. FIG. 13. As the swing arm hook cylinder 42 continuous to retract, the swing arm pivoting hook 41 is still pivoted in the pivoting direction such that the arcuate edge 44 continues to press against the shifting pin 39.1.

Figure 14:
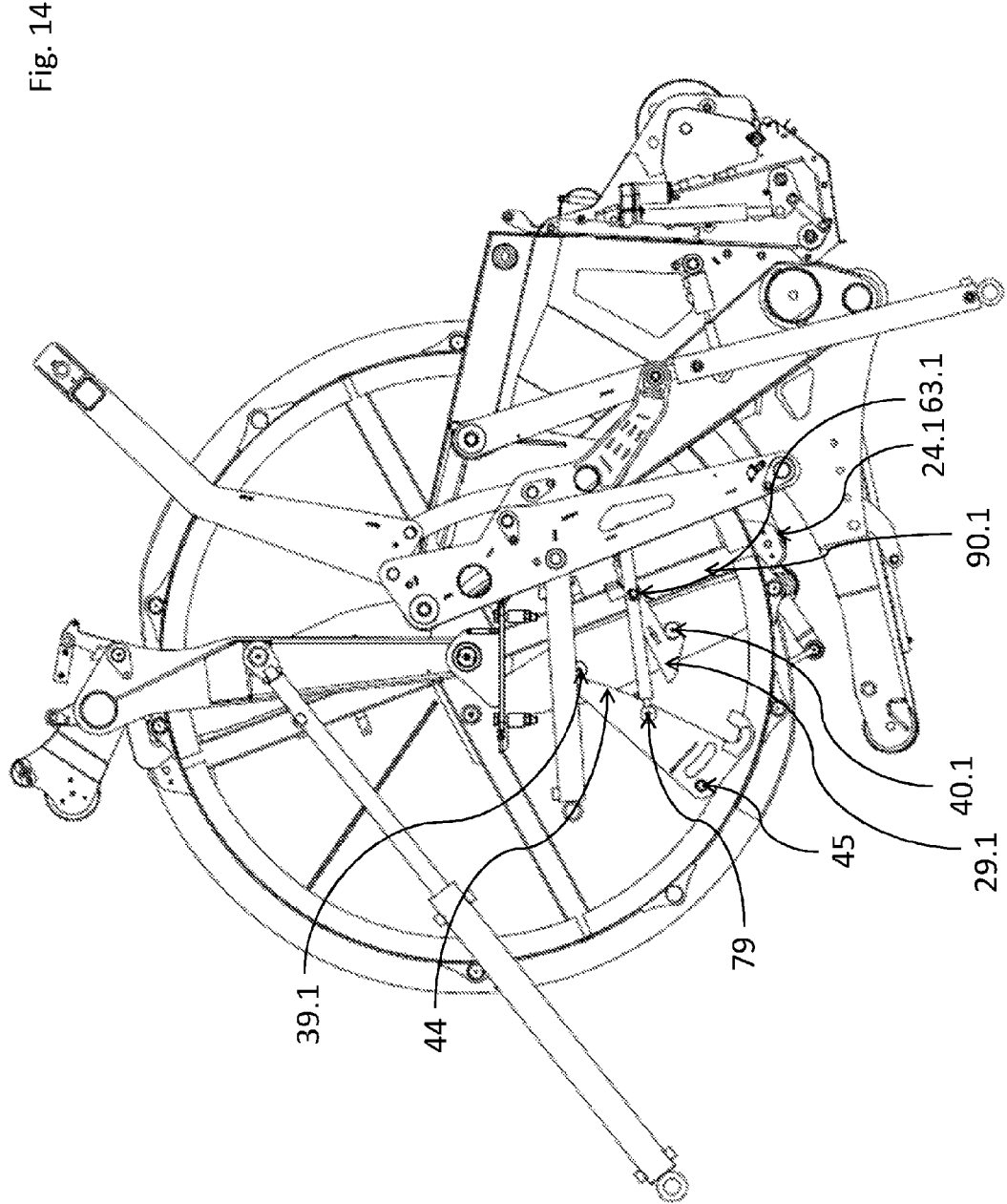
Figure 15:
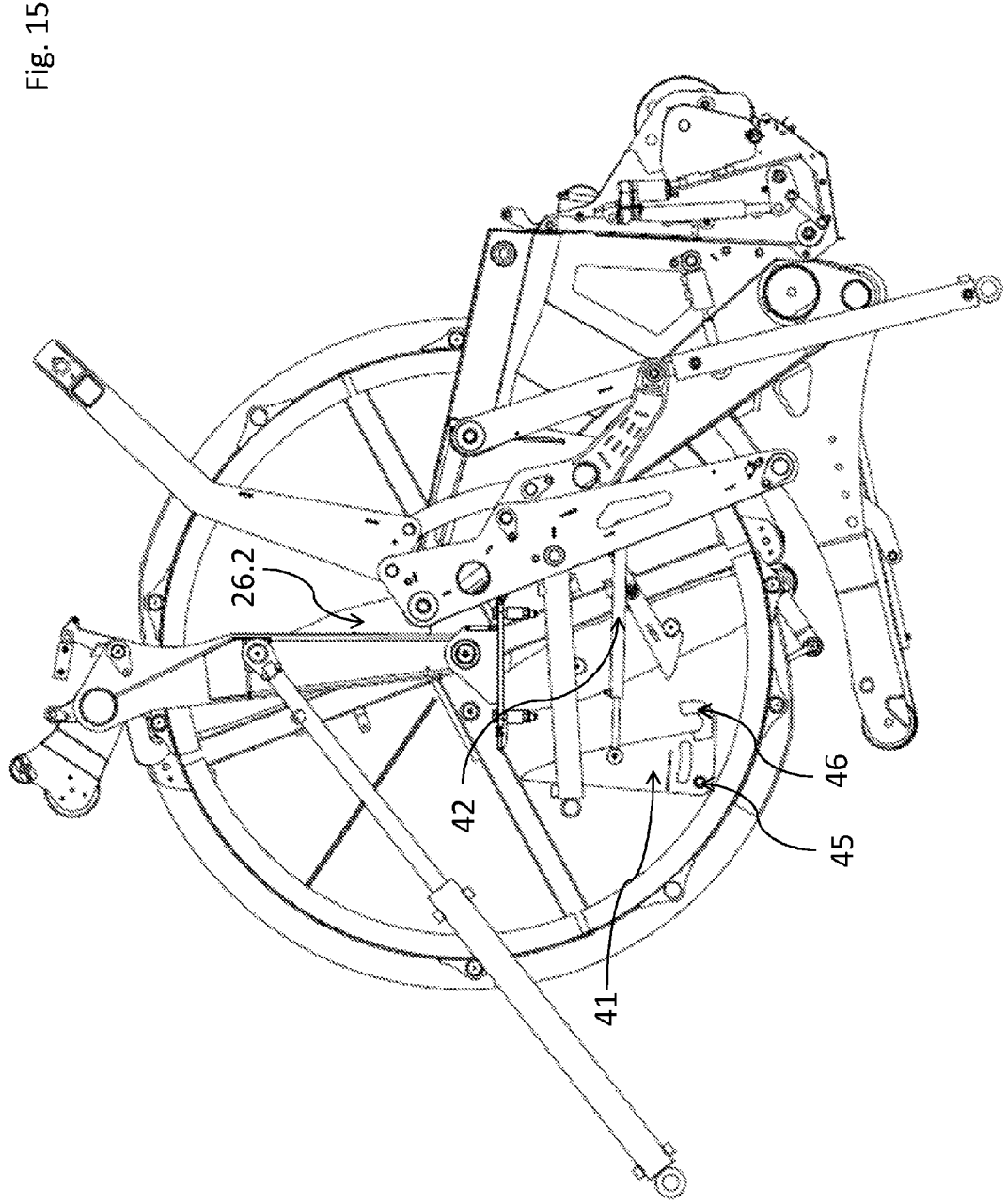

The locking pawl 29.1 now engages the coupling pin 40.1, cf. FIG. 14. The swing arm 26.1 is therefore again connected with the supporting arm 90.1. The guiding roller 28.1 is in the parking position. The swing arm hook cylinder 42 is in the fully retracted position.

As the bale forming apparatus 1 has two pivotal guiding rollers 28.1, 28.2 and two swing arms 26.1, 26.2 but only one swing arm pivoting hook 41, the same swing arm pivoting hook 41 will later be used for pivoting the other swing arm 26.2. Therefore the swing arm pivoting hook 41 is pivoted back in a position where the catching and locking hook 46 can catch the coupling pin 40.2 of the swing arm 26.2. The swing arm hook cylinder 42 is again expanded and pivots the swing arm pivoting hook 41 in the guiding direction, cf. FIG. 15. The expansion of the swing arm hook cylinder 42 is continued until the swing arm pivoting hook 41 is pivoted as much as possible, cf. FIG. 16. The swing arm 26.1 and the supporting arm 90.1 remain in the position and remain connected by the locking pawl 29.1.

The next step is to connect the swing arm 26.1 again with the supporting arm 90.1 by pivoting the locking pawl 29.1. The guiding roller 28.1 is again in the parking position.

Now the swing arm pivoting hook 41 is pivoted again such that it can pivot the other swing arm 26.2. For pivoting the swing arm locking hook cylinder 42 is expanded again and shifts the pivoting axis 79 away from the stationary pivoting axis 38.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

| REFERENCE SIGNS | |
|---|---|
| B | first bale |
| B' | second bale |
| GS | ground surface |
| TD | travelling direction of the bale forming apparatus 1 |
| 1 | bale forming apparatus |
| 2 | frame |
| 3 | wheels |
| 4 | front end with towing unit |
| 5 | intake device, comprises inlet 6 and outlet 7 |
| 6 | inlet of intake device 5 |
| 7 | outlet of intake device 5 |
| 8 | stationary supporting rollers |
| 9 | bale forming device, comprises endless belt(s) 10 |
| 10 | endless belt(s), operate as the bale forming means |
| 11 | pivotal tailgate, serves as rear housing part, comprises tailgate frame 17 and pivotal tailgate bottom 18 |
| 17 | tailgate frame |
| 18 | pivotal tailgate bottom |
| 19 | tailgate bottom roller, mounted at tailgate bottom 18 |
| 20 | wrapping device with reel 88 |
| 21 | third tailgate lever arm for pivoting the tailgate frame 17 |
| 22 | pivoting axis between tailgate bottom 18 and tailgate frame 17 |
| 23 | (left) supporting disk |
| 24.1, 24.2 | pushing rollers, mounted at supporting disk 23 |
| 25 | disk rotating axis of supporting disk 23 |
| 26.1, 26.2 | swing arms for pivotal guiding members 28.1, 28.2 |
| 27.1, 27.2 | swing arm pivoting axes for swing arms 26.1, 26.2 spaced-apart from the disk rotating axis 25 |
| 28.1, 28.2 | pivotal guiding rollers, mounted on the swing arms 26.1, 26.2 |
| 29.1, 29.2 | locking pawls for locking the pushing roller 24.1, 24.2 with the pivotal guiding roller arms 26.1, 26.2 |
| 30 | actuator arm, rotates supporting disk 23 |
| 31 | actuating cylinder for moving the actuator arm 30, pivotally connected with the actuator arm 30 in pivoting axis 96 |
| 32 | coupling device, comprises the disk engaging hook 33 and the disk locking cylinder 83 |
| 33 | disk engaging hook of the coupling device, can engage one coupling pin 34.1, 34.2, 34.3 |
| 34.1, 34.2, 34.3 | coupling pins mounted at supporting disk 23 which can be coupled with actuator arm 30 via coupling device 32 |
| 35 | retarding device for the supporting disks 23 |
| 36 | fixed guiding element above the front supporting roller 8.1, 8.2 |
| 37 | bale release control device |
| 38 | stationary pivoting axis of the swing arm pivoting hook cylinder 42 |
| 39.1 | shifting pin, mounted on the swing arm 26.1 between the pivoting axis 27.1 and the coupling pin 40.1 |
| 40.1 | coupling pin, mounted on the swing arm 26.1 for the pivotal guiding roller 28.1 |
| 40.2 | coupling pin, mounted on the swing arm 26.2 for the pivotal guiding roller 28.2 |
| 41 | swing arm pivoting hook for the swing arm 26.1 |
| 42 | swing arm hook cylinder, moves swing arm pivoting hook 41 |
| 44 | arcuate guiding edge of the swing arm pivoting hook 41 |

REFERENCE SIGNS

| | |
|---|---|
| 45 | stationary pivoting axis of swing arm pivoting hook 41 |
| 46 | catching and locking hook at the swing arm pivoting hook 41, engages the coupling pin 40.1 |
| 50 | flipper element, prevents supporting disk 23 from rotating opposite to rotating direction 100 |
| 60 | pivotal tensioning arm for tensioning the pressing belts 10 |
| 61 | tensioning lever, connects tensioning arm 60 with second tailgate lever arm 13 |
| 63.1 | pivoting axis of the locking pawl 29.1 |
| 63.2 | pivoting axis of the locking pawl 29.2 |
| 74.1, 74.2 | pivoting axes of rollers for pressing belts |
| 79 | pivoting axis between swing arm pivoting hook 41 and swing arm hook cylinder 42 |
| 80 | tailgate bottom cylinder, pivots tailgate bottom 18 |
| 88 | reel with wrapping material, belongs to wrapping device 20 |
| 89 | stationary pivoting axis of the horizontal tailgate cylinder 15 |
| 90.1, 90.2 | supporting arms for the pushing rollers 24.1, 24.2, operate as spokes of the supporting disk 23 |
| 95 | stationary pivoting axis of actuating cylinder 31 |
| 96 | pivoting axis between the actuating cylinder 31 and the actuator arm 30 |
| 100 | disk rotating direction |

The invention claimed is:

1. A bale forming apparatus for forming cylindrical bales from material, the bale forming apparatus comprising:
an intake device with an outlet;
a bale forming device;
at least one pivotal guiding member;
at least one pivotally mounted guiding member arm for the pivotal guiding member;
a pivotally mounted guiding member arm pivoting element; and
an actuating means,
wherein the bale forming device comprises a bale forming means,
wherein the pivotal guiding member is mounted at a free end of the guiding member arm,
wherein the intake device is adapted for conveying material through the outlet into a bale forming chamber,
wherein the bale forming chamber is situated adjacent to the outlet and is surrounded by the bale forming means,
wherein the bale forming device is adapted for forming a bale from material conveyed into the bale forming chamber by means of the bale forming means, the pivotal guiding member is adapted for being pivoted into a guiding position and into a parking position,
wherein the pivotal guiding member in the guiding position guides the bale forming means,
wherein the guiding member arm is adapted for being pivoted into a guiding direction and into a parking direction being opposite to the guiding direction,
wherein the bale forming apparatus is adapted such that pivoting the guiding member arm in the guiding direction causes the guiding member to be pivoted into the guiding position and such that pivoting the guiding member arm in the parking direction causes the guiding member to be pivoted into the parking position,
wherein the guiding member arm pivoting element is adapted for being pivoted in the guiding direction and in the parking direction,
wherein the actuating means is adapted for pivoting the guiding member arm pivoting element around a pivoting element pivoting axis in a pivoting direction,
wherein the pivoting direction is the parking direction or the guiding direction, the bale forming apparatus is arranged such that pivoting the guiding member arm pivoting element in the pivoting direction causes the guiding member arm to be pushed in the pivoting direction, and
the actuating means together with the guiding member arm pivoting element are adapted for pivoting the guiding member arm in a direction opposite to the pivoting direction.

2. The bale forming apparatus according to claim 1,
wherein the guiding member arm pivoting element is mounted such that it can be pivoted around a pivoting element pivoting axis, and
wherein the actuating means is adapted for pivoting the guiding member arm pivoting element around the pivoting element pivoting axis in the parking direction as well as in the guiding direction.

3. The bale forming apparatus according to claim 2,
wherein the guiding member arm is mounted such that it can be pivoted around an arm pivoting axis, and
wherein the bale forming apparatus is adapted such that a distance between the arm pivoting axis and the pivoting element pivoting axis occurs.

4. The bale forming apparatus according to claim 1, wherein the bale forming apparatus comprises:
a further pivotal guiding member; and
a pivotally mounted guiding member arm for the further pivotal guiding member,
wherein every pivotal guiding member is mounted on a free end of the corresponding guiding member arm and can be pivoted into the guiding position and into the parking position, the bale forming apparatus is adapted such that pivoting the guiding member arm pivoting element in the pivoting direction causes one guiding member arm to be pivoted in the pivoting direction while the pivotal guiding member mounted on the other guiding member arm is in the parking position, and
wherein the bale forming apparatus is further adapted such that pivoting later the guiding member arm pivoting element in the pivoting direction causes the other guiding member arm to be pivoted in the pivoting direction.

5. The bale forming apparatus according to claim 1, wherein the bale forming apparatus comprises a coupling device, and the coupling device is adapted for temporally coupling the guiding member arm with the guiding member arm pivoting element.

6. The bale forming apparatus according to claim 5, wherein the coupling device comprises a pin rigidly mounted at the guiding member arm, and the bale forming apparatus is adapted such that pivoting the guiding member arm pivoting element in the pivoting direction causes the guiding member arm pivoting element to shift the pin in the pivoting direction.

7. The bale forming apparatus according to claim 5, wherein the coupling device comprises:
a further pin rigidly mounted at the guiding member arm; and
a hook rigidly mounted at the guiding member arm pivoting element,
wherein the hook is adapted for temporally engaging the further pin.

8. The bale forming apparatus according to claim 1, wherein the bale forming apparatus comprises:
a further pivotal member; and
a locking device,
wherein the locking device can be pivoted into a locking position and into a releasing position, wherein the locking device in the locking position connects the guiding member arm with the further pivotal member, wherein the actuating means comprises:
a pivotal member actuator; and
an arm actuator, wherein the pivotal member actuator is adapted for pivoting the further pivotal member in the pivoting direction such that the guiding member arm is pivoted in the pivoting direction as long as the locking device connects the guiding member arm with the further pivotal member, and wherein the arm actuator is adapted for effecting a pivotal movement of the guiding member arm with respect to the further pivotal member in a direction opposite to the pivoting direction if the locking device is in the releasing position.

9. The bale forming apparatus according to claim 1, wherein the bale forming apparatus comprises:
a rotatable member with a circumferential surface; and
a further actuator,
wherein the rotatable member is mounted such that it can be rotated around a rotating axis, and
wherein the further actuator is adapted for rotating the rotatable member around the rotating axis in a rotating direction, the bale forming apparatus is adapted such that the distance between the guiding member and the rotating axis is larger when the guiding member is in the guiding position than in the parking position.

10. The bale forming apparatus according to claim 9, wherein the guiding member arm pivoting element is mounted such that it can be pivoted around a pivoting element pivoting axis,
wherein the guiding member arm is mounted such that it can be pivoted around an arm pivoting axis, and
wherein the bale forming apparatus is arranged such that a distance between the arm pivoting axis and the rotating axis occurs.

11. The bale forming apparatus according to claim 1, wherein the bale forming apparatus comprises:
a frame; and
a rear housing part,
wherein the rear housing part is pivotally connected with the frame,
wherein the bale forming apparatus is adapted for pivoting the rear housing part into a bale releasing position and for ejecting a bale formed in the bale forming chamber, and
wherein the bale forming apparatus is arranged such that the guiding member arm is situated between the outlet and the rear housing part when the guiding member is in the guiding position.

12. The bale forming apparatus according to claim 2, wherein the bale forming apparatus comprises:
a further pivotal guiding member; and
a pivotally mounted guiding member arm for the further pivotal guiding member,
wherein every pivotal guiding member is mounted on a free end of the corresponding guiding member arm and can be pivoted into the guiding position and into the parking position, the bale forming apparatus is adapted such that pivoting the guiding member arm pivoting element in the pivoting direction causes one guiding member arm to be pivoted in the pivoting direction while the pivotal guiding member mounted on the other guiding member arm is in the parking position, and wherein the bale forming apparatus is further adapted such that pivoting later the guiding member arm pivoting element in the pivoting direction causes the other guiding member arm to be pivoted in the pivoting direction.

13. The bale forming apparatus according to claim 3, wherein the bale forming apparatus comprises:
a further pivotal guiding member; and
a pivotally mounted guiding member arm for the further pivotal guiding member,
wherein every pivotal guiding member is mounted on a free end of the corresponding guiding member arm and can be pivoted into the guiding position and into the parking position, the bale forming apparatus is adapted such that pivoting the guiding member arm pivoting element in the pivoting direction causes one guiding member arm to be pivoted in the pivoting direction while the pivotal guiding member mounted on the other guiding member arm is in the parking position, and wherein the bale forming apparatus is further adapted such that pivoting later the guiding member arm pivoting element in the pivoting direction causes the other guiding member arm to be pivoted in the pivoting direction.

14. The bale forming apparatus according to claim 2, wherein the bale forming apparatus comprises a coupling device, the coupling device is adapted for temporally coupling the guiding member arm with the guiding member arm pivoting element.

15. The bale forming apparatus according to claim 3, wherein the bale forming apparatus comprises a coupling device, and the coupling device is adapted for temporally coupling the guiding member arm with the guiding member arm pivoting element.

16. The bale forming apparatus according to claim 4, wherein the bale forming apparatus comprises a coupling device, and the coupling device is adapted for temporally coupling the guiding member arm with the guiding member arm pivoting element.

17. The bale forming apparatus according to claim 6, wherein the coupling device comprises:
a further pin rigidly mounted at the guiding member arm; and
a hook rigidly mounted at the guiding member arm pivoting element,
wherein the hook is adapted for temporally engaging the further pin.

18. A bale forming method for forming cylindrical bales of material, the bale forming method comprising the steps of:
an intake device conveys material through an outlet into a bale forming chamber adjacent to the outlet;
a bale forming device forms a cylindrical bale in the bale forming chamber by means of a bale forming means surrounding the bale forming chamber, wherein the bale is formed from material which is conveyed into the bale forming chamber;
a guiding member which is mounted on a free end of a pivotally mounted guiding member arm is pivoted into a guiding position;
the guiding member in the guiding position guides the bale forming device; and
the guiding member is afterwards pivoted from the guiding position into a parking position;
pivoting the guiding member into the guiding position is effected by pivoting the guiding member arm in a guiding direction; and
pivoting the guiding member into the parking position is effected by pivoting the guiding member arm in a parking direction being opposite to the guiding direction;

actuating means pivots a pivotally mounted guiding member arm pivoting element in a pivoting direction, where the pivoting direction is the parking direction or the guiding direction;

pivoting the guiding member arm pivoting element in the pivoting direction causes the guiding member arm to be pushed in the pivoting direction; and the actuating means together with the guiding member arm pivoting element causes the step that the guiding member arm is pivoted in a direction opposite to the pivoting direction.

19. The bale forming method according to claim 18, wherein the step that the guiding member arm is pivoted in the pivoting direction comprises the steps of:

locking locking device is switched into a locking position such that the locking device in the locking position connects the guiding member arm with a further pivotal member;

a pivotal member actuator being part of the actuating means pivots the further pivotal member in the pivoting direction such that the guiding member arm is pivoted in the pivoting direction as long as the locking device remains in the locking position, and the step that the guiding member arm is pivoted in the opposite direction comprises the steps that the locking device is switched into a releasing position and an arm actuator being part of the actuating means together with the guiding member arm pivoting element effect a pivotal movement of the guiding member arm with respect to the further guiding member in the opposite direction.

* * * * *